US012810058B2

(12) United States Patent
Pande

(10) Patent No.: US 12,810,058 B2
(45) Date of Patent: Nov. 24, 2026

(54) SYSTEM AND METHOD FOR AUTOMATED RECOMMENDATION OF TEMPLATE LAYOUTS

(71) Applicant: OPEN TEXT INC., Menlo Park, CA (US)

(72) Inventor: Vaibhav Pradip Pande, Amravati (IN)

(73) Assignee: OPEN TEXT INC., Provo, UT (US)

( * ) Notice: Subject to any disclaimer, the term of this patent is extended or adjusted under 35 U.S.C. 154(b) by 373 days.

(21) Appl. No.: 18/394,969

(22) Filed: Dec. 22, 2023

(65) Prior Publication Data

US 2025/0209259 A1 Jun. 26, 2025

(51) Int. Cl.
*G06F 3/048* (2013.01)
*G06F 40/106* (2020.01)
*G06F 40/186* (2020.01)
*G06F 3/0484* (2022.01)

(52) U.S. Cl.
CPC .......... *G06F 40/186* (2020.01); *G06F 40/106* (2020.01); *G06F 3/0484* (2013.01)

(58) Field of Classification Search
CPC ....... G06F 40/186; G06F 40/106; G06F 3/048
See application file for complete search history.

(56) References Cited

U.S. PATENT DOCUMENTS 12,013,883 B1 * 6/2024 Shukla .................... G06F 16/31
2007/0100948 A1 * 5/2007 Adams .................... H04L 51/02 709/206
2009/0216545 A1 * 8/2009 Rajkumar .............. G06Q 10/10 705/348
2010/0083129 A1 * 4/2010 Mishra ...................... G06F 8/38 715/744
2011/0078570 A1 * 3/2011 Larsen .................. G06F 40/166 715/710
2012/0254730 A1 * 10/2012 Sunderland ........... G06F 40/186 715/234
2015/0227868 A1 * 8/2015 Saraf .................. G06Q 10/0635 705/7.28

(Continued)

OTHER PUBLICATIONS

Chen et al., DocDancer: Authoring Ultra-responsive Documents with Layout Generation, 2023, IEEE, 6 pages. (Year: 2023).*

*Primary Examiner* — Linh K Pham
(74) *Attorney, Agent, or Firm* — Sprinkle IP Law Group

(57) ABSTRACT

Embodiments of the present disclosure provides systems and methods for automatically recommending layout information for templates and template elements during template design/editing. A computer-implemented method includes receiving, based on a user interaction with the graphical user interface, a request to add a template element to a template, determining a recommended layout for the template element based on a document event dataset and a layout information dataset, presenting the recommended layout for the template element in the graphical user interface as a first recommendation; adding the template element to the template formatted according to the recommended layout for the template element and storing the new template in a database of templates used to electronically generate documents. The document event dataset comprises data for user action events on electronic documents generated from template and the layout information dataset comprises layout information from the template.

21 Claims, 17 Drawing Sheets

(56) References Cited

U.S. PATENT DOCUMENTS

| | | | | |
|---|---|---|---|---|
| 2015/0227869 | A1* | 8/2015 | Saraf | G06Q 10/0635<br>705/7.28 |
| 2017/0220544 | A1* | 8/2017 | Masson | G06F 16/951 |
| 2017/0220545 | A1* | 8/2017 | Gururajan | G06F 40/106 |
| 2018/0205600 | A1* | 7/2018 | Burton | H04L 41/0843 |
| 2019/0129931 | A1* | 5/2019 | Hegde | G06Q 40/06 |
| 2021/0133389 | A1* | 5/2021 | Bischoff | G06F 40/151 |
| 2021/0342785 | A1* | 11/2021 | Mann | G06F 40/18 |
| 2022/0414323 | A1* | 12/2022 | Sreenivasan | G06F 40/186 |
| 2023/0013012 | A1* | 1/2023 | Bond | G06Q 30/018 |
| 2023/0102210 | A1* | 3/2023 | Tendolkar | G06F 3/0481<br>715/204 |
| 2024/0111946 | A1* | 4/2024 | Hunn | G06F 40/186 |
| 2025/0240300 | A1* | 7/2025 | Son | H04L 63/102 |

* cited by examiner

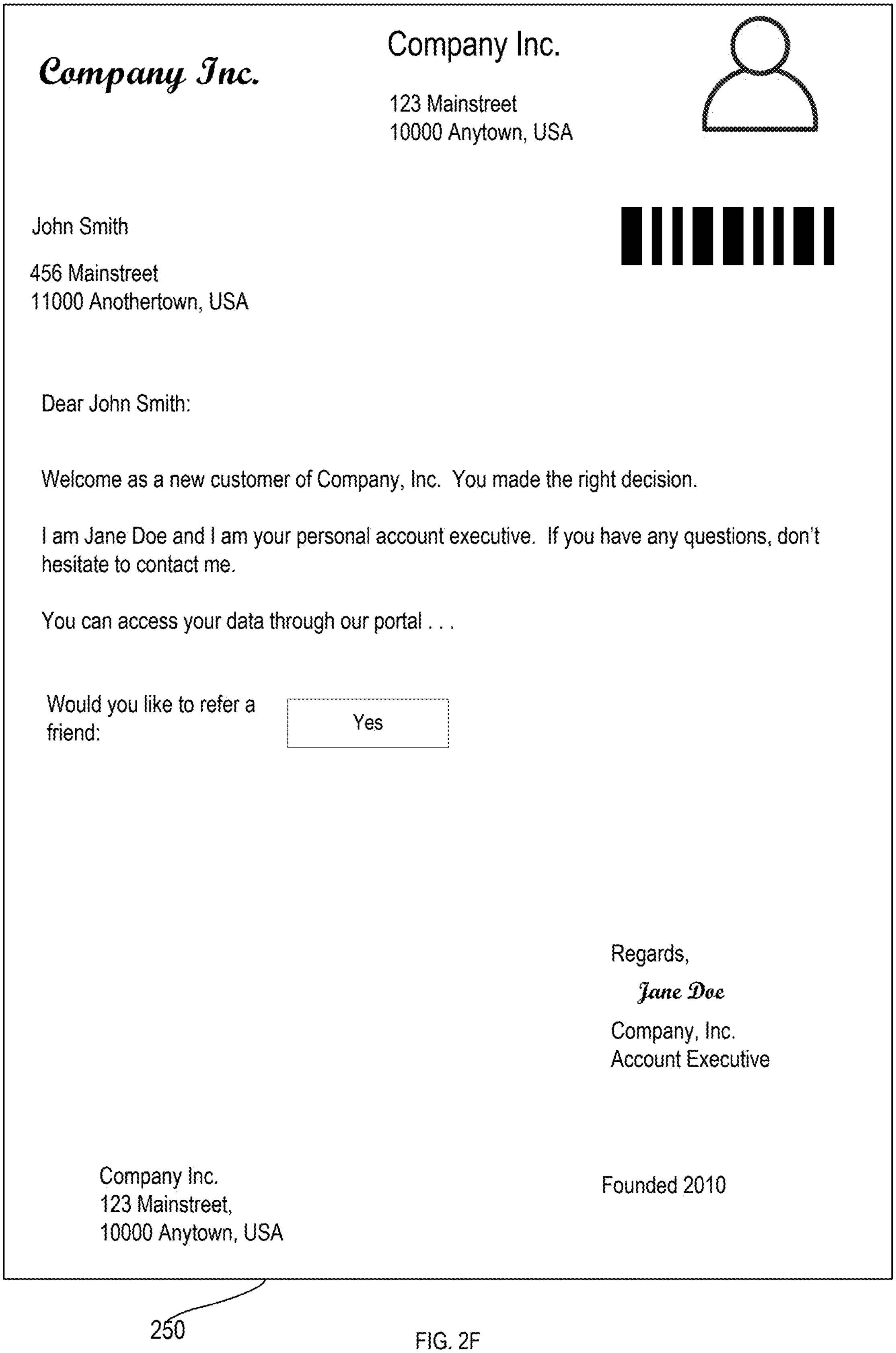

*Company Inc.*

Company Inc.

123 Mainstreet
10000 Anytown, USA

John Smith

456 Mainstreet
11000 Anothertown, USA

Dear John Smith:

Welcome as a new customer of Company, Inc. You made the right decision.

I am Jane Doe and I am your personal account executive. If you have any questions, don't hesitate to contact me.

You can access your data through our portal . . .

Would you like to refer a friend: Yes

Regards,

*Jane Doe*

Company, Inc.
Account Executive

Company Inc.
123 Mainstreet,
10000 Anytown, USA

Founded 2010

250

FIG. 2F

SYSTEM AND METHOD FOR AUTOMATED RECOMMENDATION OF TEMPLATE LAYOUTS

TECHNICAL FIELD

This disclosure relates generally to the management, development, editing and deployment of content. More particularly, this disclosure relates to creating or otherwise editing templates for electronic communications.

BACKGROUND

Enterprises use several channels to communicate with customers. These communications can occur through several output channels including, but not limited to, email, Short Message Service (SMS) text, web page, and mobile application. Customer communication management (CCM) solutions organize and manage delivery of customer communications including, in some implementations, communications across multiple channels.

In some CCM solutions, a user can define templates where a template specifies the layout of content and common content of customer communications. The CCM solution uses the templates to generate individualized documents for delivery to target end users (e.g., customers). For example, a CCM solution might use a template offer letter to generate individualized offer letter emails to customers.

One aspect of creating a template is defining a layout that specifies the arrangement of elements (e.g., text, images, style) for a page or other unit of content. Currently, the template design process is largely subjective, with the designers using their own judgment, informed by their personal knowledge and principles of document and graphic design, as to what layout will be effective. Many people, especially those not familiar with document and graphic design, struggle to layout elements in an aesthetically pleasing and, more importantly, effective way.

As such, improved methods of template layout design are needed.

SUMMARY

Customer communications management (CCM) solutions rely on electronic templates that can be used to automatically generate individualized communications to end users. For example, an enterprise using a CCM solution may define a template offer letter that the CCM solution populates with individualized data to generate print documents or electronic communications to individuals.

Template design, however, has typically been a largely subjective and manual task. Embodiments of the present disclosure provide mechanisms for automatically recommending layouts thus decreasing the template design time and increasing the effectiveness of templates.

One embodiment includes a system recommending layouts when composing templates for automatically generating communications. The system includes a computer memory storing, in association with a plurality of templates of a template type, a first layout information dataset comprising layout information for a plurality of template elements contained in the plurality of templates. The memory further stores a first document event dataset comprising user action events captured on documents electronically generated from the plurality of templates. The system further comprises a processor coupled to the computer memory and a non-transitory, computer-readable medium. The non-transitory, computer-readable medium stores thereon a set of computer-executable instructions that are executable by the processor where the set of computer-executable instructions comprising instructions for: providing a graphical user interface for authoring a new template of the template type and receiving, based on a user interaction with the graphical user interface, a request to add a first template element of a first template element type to the new template. The set of computer-executable instructions comprise instructions for determining a recommended layout for the first template element based on a second document event dataset and a second layout information dataset, the second document event dataset comprising data, from the first document event dataset, for events captured on electronic documents generated from a first template from the plurality of templates, and the second layout information dataset comprising layout information for the first template from the first layout information dataset. The set of computer-executable instructions comprise instructions for presenting the recommended layout for the first template element in the graphical user interface as a first recommendation, adding the first template element to the new template formatted according to the recommended layout for the first template element and storing the new template in a database of templates used to electronically generate documents.

Another embodiment of the present disclosure includes a computer program product comprising a non-transitory, computer-readable medium storing thereon a set of computer-executable instructions that are executable by a processor. The set of computer-executable instructions comprise instructions for storing, in a computer memory, in association with a plurality of templates of a template type, a first layout information dataset for a plurality of template elements contained in the plurality of templates and a first document event dataset for events captured on documents electronically generated from the plurality of templates, providing a graphical user interface for authoring a new template of the template type, and receiving, based on a user interaction with the graphical user interface, a request to add a first template element of a first template element type to the new template. The set of computer-executable instructions comprise instructions for determining a recommended layout for the first template element based on a second document event dataset and a second layout information dataset, the second document event dataset comprising data, from the first document event dataset, for events captured on electronic documents generated from a first template from the plurality of templates, and the second layout information dataset comprising layout information for the first template from the first layout information dataset. The set of computer-executable instructions comprise instructions for presenting the recommended layout for the first template element in the graphical user interface as a first recommendation, adding the first template element to the new template formatted according to the recommended layout for the first template element and storing the new template in a database of templates used to electronically generate documents.

Another embodiment includes a computer-implemented method for composing templates used for automated generation of communications. The method includes storing, in a computer memory, in association with a plurality of templates of a template type, a first layout information dataset for a plurality of template elements contained in the plurality of templates and a first document event dataset for events captured on a document set electronically generated from the plurality of templates, providing a graphical user interface for authoring a new template of the template type, receiving, based on a user interaction with the graphical user interface, a request to add a first template element of a first template element type to the new template, determining a recommended layout for the first template element based on a second document event dataset and a second layout information dataset, the second document event dataset comprising data, from the first document event dataset, for events captured from electronic documents generated from a first template from the plurality of templates, and the second layout information dataset comprising layout information for the first template from the first layout information dataset, presenting the recommended layout for the first template element in the graphical user interface as a first recommendation, adding the first template element to the new template formatted according to the recommended layout for the first template element, and storing the new template in a database of templates used to electronically generate documents.

The recommended layout, according to one embodiment, comprises at least one of a recommended element location, a recommended element size, a recommended font, a recommended background, or a recommended color.

According to one embodiment, determining the recommended layout for the first template element comprises determining candidate templates from the plurality of templates based on a template selection criterion, wherein the first template is a candidate template and wherein the second document event dataset includes data for events captured on electronic documents generated from each of the candidate templates, selecting the first template as layout source template from the candidate templates based on ranking the candidate templates using the second document event dataset, and selecting a layout of a respective template element of the first template element type in the first template as the recommended layout for the first template element in the new template.

According to another embodiment, determining the recommended layout for the first template element comprises determining candidate templates from the plurality of templates based on a template selection criterion, wherein the first template is a candidate template and wherein the second document event dataset includes data for events captured on electronic documents generated from each of the candidate templates, determining effective templates from the candidate templates based on the second document event dataset, generating exemplar documents from the effective templates, determining a similarity between the exemplar documents, and based on a determination of the similarity between the exemplar documents, selecting as the recommended layout for the first template element, a layout of a template element of the first template element type contained in one of the effective templates.

Embodiments can include a machine learning model that represents the first layout information dataset and the first document event dataset. The request to add the first template element can comprise editing event data. Determining the recommended layout for the first template element, according to one embodiment, comprises extracting editing event features from the editing event data, the editing event features comprising a template metadata feature and a template element metadata feature, generating a feature vector using the editing event features and processing the feature vector with the machine learning model to output the recommended layout. According to one embodiment, the layout information represented by the machine learning model includes a parameter indicating whether a user accepted a prior layout recommendation for the first template element.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore nonlimiting, embodiments illustrated in the drawings, wherein identical reference numerals designate the same components. Note that the features illustrated in the drawings are not necessarily drawn to scale.

FIG. 2A, FIG. 2B, FIG. 2C, FIG. 2D, FIG. 2E and FIG. 2F are diagrammatic representations of one embodiment of designing a document page template and a page generated from the template;

DETAILED DESCRIPTION

The invention and the various features and advantageous details thereof are explained more fully with reference to the nonlimiting embodiments that are illustrated in the accompanying drawings and detailed in the following description. Descriptions of well-known starting materials, processing techniques, components and equipment are omitted so as not to unnecessarily obscure the invention in detail. It should be understood, however, that the detailed description and the specific examples, while indicating some embodiments of the invention, are given by way of illustration only and not by way of limitation. Various substitutions, modifications, additions and/or rearrangements within the spirit and/or scope of the underlying inventive concept will become apparent to those skilled in the art from this disclosure.

As mentioned, a computer system may use a template to generate electronic documents for communication to target end users. For example, an enterprise may use a template offer letter to generate customer specific offer letters that are communicated via email or other channels to customers. For purposes of this disclosure, an "editing event" refers to an event captured with respect to adding or editing a new template or editing an existing template. A "document event" refers to an event captured with respect to a document generated from a template. Document events include events such as generating the document, submitting the document to a delivery platform for delivery to an end user, and other events that can be captured with respect to the document. Document events include user actions recordable with respect to a document, such as an end user opening a document generated from the template, the end user clicking on a link in the document generated from the template, the end user purchasing a product or service referenced in a document generated from the template.

Embodiments of the present disclosure utilize automated processes to suggest or create template layouts based on the effectiveness of prior templates. By using user action data, embodiments incorporate information related to the effectiveness of past communications, and thus, the templates from which those communications were generated. As such, such information can be used to guide the design of templates.

More particularly, a system can analyze document events, including user actions, for documents generated from templates, to determine efficiency parameters for the templates used to generate the documents. When the system captures an editing event on a template, the system can use the efficiency parameters determined for and the layout information from the analyzed templates to determine the most effective layout and recommend layout information for the template being edited. The recommended layout information may include recommendations for some or all the layout parameters for a template or template element.

Figure 1:
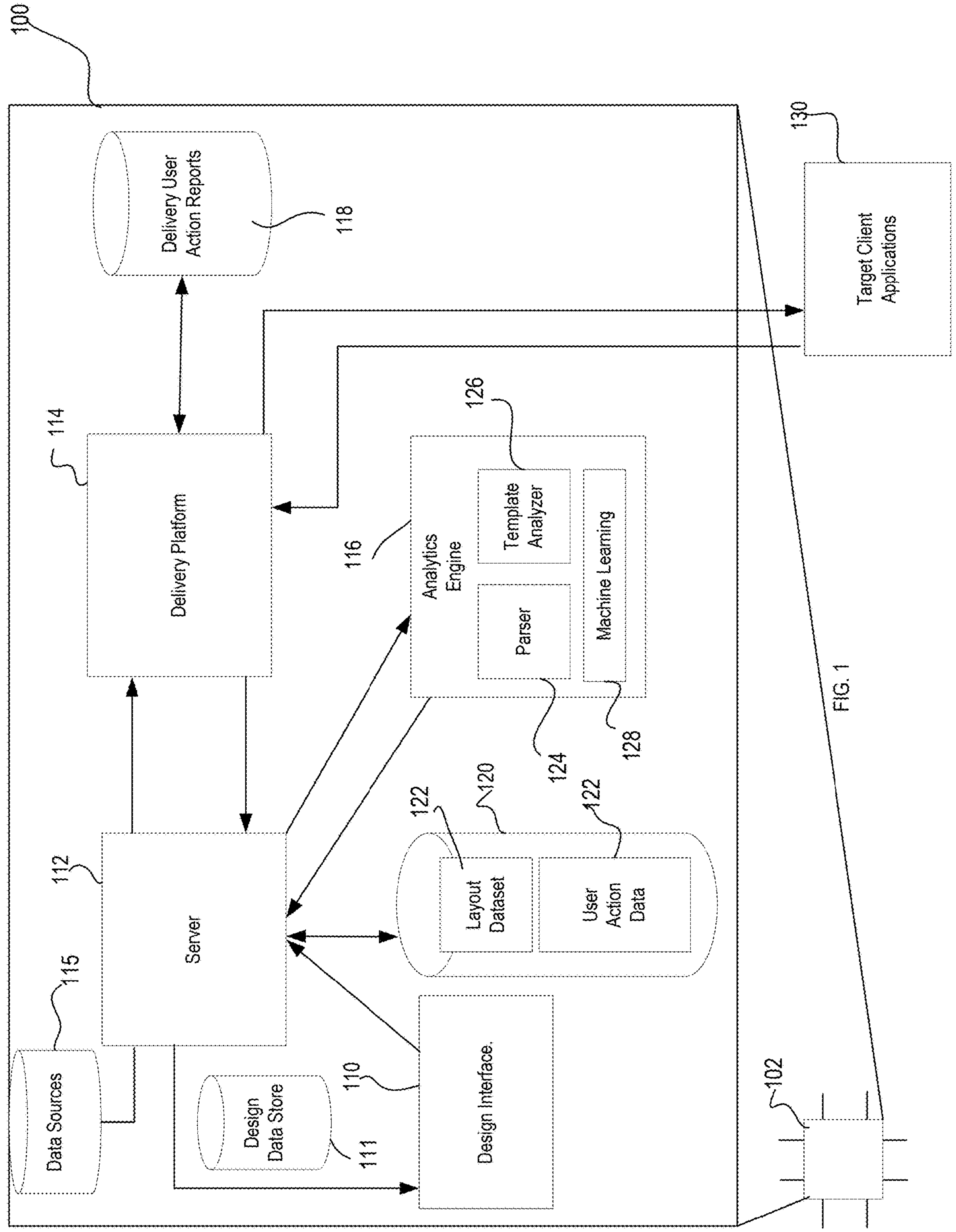
FIG. 1 is a diagrammatic representation of one embodiment of a computer implemented system.

Referring then to FIG. 1, one embodiment of a computer-implemented customer communication management (CCM) system 100 is depicted. CCM system 100 incorporates a template layout recommendation system. System 100, according to one embodiment, is implemented by a computer processor 102 executing software instructions. Processor 102, in some embodiments, includes processors on server machines, such as processors in a cloud computing environment or at other server machines, and processors at client machines. Thus, in some embodiments, CCM system 100 may be implemented by a distributed, networked computing environment comprising a plurality of computing systems and applications coupled through a network. The network may be the Internet, an intranet, a wireless or wired network, a local access network (LAN), a wide access network (WAN), a cellular network or some combination of these types of networks, or another type or types of networks.

CCM system 100 includes a template design application 110, a design data store 111, a production server 112, a delivery platform 114, an analytics engine 116, a user action reports store 118, and a layout recommendation knowledge store 120. CCM system 100 uses templates provided via template design application 110 to generate documents that may be sent to customers via one or more channels. For electronic documents, the documents are accessed by target client applications 130, such as e-mail applications, SMS applications, web browsers or other applications. In addition, or in the alternative, CCM system 100 uses templates designed via template design application 110 to generate output to print drivers for print campaigns.

When transforming a template into customer-specific documents, server 112 may pull data from a variety of data sources 115. Data sources 115 comprise, for example, digital asset management (DAM) systems, content management systems (CMS), web content management (WCM) systems, enterprise content management (ECM) systems, and external data sources.

CCM system 100 implements a design environment that allows designers to create templates for use by server 112 to generate potentially individualized documents. To this end, the enterprise CCM environment includes template design application 110 to provide the design environment in which designers can create and edit templates. Template design application 110, in some embodiments, comprises a resident template design application at a designer's computer system. In another embodiment, template design application 110 comprises a remotely accessed application, such as a web-based application.

According to one embodiment, template design application 110 provides an object-oriented design environment in which components of a design, including templates and template elements, are typed objects. Template design application 110 stores templates to a design data store 111.

In a design phase, a designer (e.g., users with appropriate permissions to act as template designers) create templates to be used in generating documents to target end-users. The template design application 110 may thus present the user with a graphical interface at the user's computing device to allow the user to design and select elements for inclusion in a created template and to specify which areas of the template may accept content or where content may otherwise be changed, added, removed or updated. The template design application 110 may also allow the designed template to be saved in a content management system of the enterprise such that the template may be managed as content of the enterprise.

A template specifies template elements to be included in a page or content unit of a document and the layout of the template elements. The layout specifies the arrangement of template elements (e.g., text, images) in a page or content unit. For example, in some embodiments, the layout specifies the absolute or relative sizes and positions of various elements in a page. The layout may also, in some embodiments, specify the content type for the template element (e.g., image, text, or another type of template element). In the template, the template elements are not necessarily associated with the content that will populate the template elements. For example, a layout might specify the size and position of a text area in a page but leave the text area to be populated in later steps. In other embodiments, the template elements in a template include content. For example, an image element may be populated with a particular image in the template.

In some embodiments, the layout includes positions, dimensions, position orderings. For example, in one embodiment, a rectangular layout includes the position and dimensions of the template element. A non-rectangular layout, in one embodiment, includes multiple positions and position ordering. Layouts for a template element may also specify features, such as, but not limited to background color, type of content (text, image, line, etc.), font size, font color, data source for the element, controls on when the element should appear, calculations related to the element.

A template can specify editable and viewable text for a page, optional and selectable paragraphs for the page, variables, values for variables or text areas of the page, sources for content of the page, rules for populating content of the page, resource rights for the page, and user rights for the page, among others.

A template can thus specify the overall layout of an individual page (or other unit of content), which parts of the page will contain static information, which parts will be filled according to rules, and how content on a page behaves (e.g., reflows or otherwise behaves). A template for an interactive document may further specify which portions of the page are editable by an editor-user. Templates can reference associated styles, logic, variables or other objects.

Template design application 110 supports various user editing actions on templates. When a user selects to perform an editing action with respect to a template, template design application 110 captures relevant editing event data and sends the editing event data to server 112. The editing event data includes, according to one embodiment, template metadata and, for editing actions with respect to template elements, template element metadata. Server 112 invokes analytics engine 116 to analyze the editing event data, in some cases augmented with additional data from knowledge store 120 or other sources. Analytics engine 116 provides suggested layout information for an editing action.

Example user editing actions on a template include, but are not limited to:

Add/Edit Template: add a template or edit overall template information. Example suggested overall layout information for a template, according to one embodiment, includes one or more of: page size, page orientation, background color.

Add/Edit Text: add or edit a text element. In some embodiments, text elements can be subtyped. For example, as illustrated in FIGS. 3A, 3B and 3C, the text elements of template 205 (FIG. 2E) include text: name: sender, text: address: sender, text: name: recipient, text: address: recipient, text: body content, and text: title. Example suggested layout information for a text element, according to one embodiment, includes one or more of: the location of the text element on the page, the size of the text element, the font for the text element, the font size, or the text color.

Add/Edit Image: add or edit an image element. In some embodiments, image elements can be subtyped. Examples of such types include but are not limited to, agent image and logo. Example suggested layout information for an image element includes, according to one embodiment, one or more of: the location of the image element in the page or the size of the image element.

Add/Edit Signature: add or edit a signature object. In some embodiments, object elements are subtyped. Example suggested layout information for a signature element includes, according to one embodiment, one or more of: the location of the signature element in the page or the size of the signature element.

Add/Edit Complex Object: add or edit a graph, chart or other complex type element. In some embodiments, complex type elements can be subtyped. Example suggested layout information for a complex type element includes, according to one embodiment, one or more of: the location of the element in the page, element size, font, or the color for the complex object.

Add/Edit Repeater Element: add or edit a footer, header, or page indicator. In some embodiments, repeater elements can be subtyped. Example suggested layout information for repeater elements includes, according to one embodiment, one or more of: the location of the repeater element in the page, font, font size, text color, or color of given objects in the repeater element.

Add/Edit Button: add or edit a button element. In some embodiments, button elements can be subtyped. Example suggested layout information for a button element includes, according to one embodiment, one or more of: the location of the button element in the page, size of the button element, font of descriptive text, font size, text color, or background image for button element.

The suggested layout information returned by analytics engine 116, in some embodiments, does not necessarily include a value for each layout parameter for a template or template element. In some embodiments, analytics engine 116 will not return a value for a layout parameter when it cannot determine a suggested value for the parameter. Thus, for example, if analytics engine 116 can determine a suggested font, but not text size for a text element, analytics engine 116 returns suggested layout information that includes the suggested font, but not a suggested text size. In another embodiment, analytics engine 116 returns a default value. For example, if analytics engine 116 can determine a suggested font, but not text size for a text element, analytics engine 116 returns suggested layout information that includes the suggested font and a default text size.

According to one embodiment, when a user of template design application selects layout information for the template or template element, template design application 110 sends editing event data to server 112 for storage in knowledge store 120. For example, when a user selects an overall layout for a template (e.g., page size, orientation, background color, etc.), template design application 110 sends editing event data to server 112 that includes, according to one embodiment, template metadata and template layout information. In some embodiments, the editing event data also includes an indication of whether the user selected the suggested overall template layout. Further, when the user completes an editing action to add or edit a template element, template design application 110 sends editing event data to server 112. Such editing event data includes, according to one embodiment, template metadata, template element metadata, and layout information for the template element. In some embodiments, the editing event data also includes an indication of whether the user selected the suggested layout for a template element.

In addition, or in the alternative, to storing editing event data as editing events occur, server 112 stores information about a template in knowledge store 120 when the template is indicated as complete. Such information includes, according to one embodiment, template metadata, overall template layout information, template element metadata, and layout information for the template elements contained in the template. Thus, knowledge store 120 can include a layout information dataset 122 for templates used by CCM system 100.

Once a template has been finalized, template design application 110 passes the template and related job information, such as data sources to be used to resolve variables, to server 112. Server 112 processes the template and sources data to produce documents based on the template. The type of document produced will depend on the communication channel supported or, in a multi-channel embodiment, selected. Examples of documents include, but are not limited to, emails, text messages, email attachments, web documents, mobile application pages.

Server 112 may produce an individualized document for each recipient specified in the job information or by the target audience metadata. Server 112 passes the documents generated from the template and template metadata for the template from which the documents were generated to delivery platform 114 for delivery to target end users (e.g., specified recipients).

Server 112 records document event data for templates in a document event dataset in knowledge store 120. While layout information dataset 122 and document event dataset 123 are illustrated separately in FIG. 1, they may be portions of the same database or other data storage.

The document event dataset 123 includes user action data for user actions captured on documents generated using the templates of CCM system 100, where the user action data for user actions captured with respect to documents generated from a template are associated, in knowledge store 120, with the template from which those documents were generated. In some embodiments, server 112 receives at least a portion of the user action data from delivery platform 114.

More particularly, server 112 records performance metrics for document templates, including performance metrics for user actions on documents generated from the templates. Examples of performance metrics include, but are not limited to: the number of documents generated from a template that were sent to target end users (e.g., based on recorded document send events), the number of documents generated from a template that were submitted for delivery to target end users (e.g., based on recorded document submit events), the number of documents generated from a template that were delivered to target end users (e.g., based on recorded delivery events), the number of documents generated from a template that were read (e.g., based on recorded read events), the read rate of documents generated from the template based on recorded read events, the number of documents generated from the template that were opened (e.g., based on recorded open events), the open rate of documents generated from the template, number of documents generated from the template in which links were clicked (e.g., based on recorded link click events), the link click rate for documents generated from the template, number of purchases that resulted from documents generated from a template (e.g., based on recorded purchase events), or purchase rate for documents generated from a template. In some embodiments, delivery platform 114 or server 112 calculates rates for a template (e.g., read rate, open rate, click rate, purchase rate, or other rate) based on the number of documents generated from the template, the number of documents generated from the template that were submitted for delivery to end users, a number of documents generated from a template that were sent to end users, or a number of documents generated from a template for which delivery to end users was confirmed.

According to one embodiment, delivery platform 114 tracks a variety of information about the communications to and responses from end-users. Examples of such information include, but are not limited to, the template used to generate a document and document events. Document events include specified user actions with respect to documents delivered by delivery platform 114. Examples of specified user actions with respect to documents include, but are not limited to: opening a document, reading a document, clicking on a link in a document, purchasing a product referenced in the document. Some of the user action data recorded by delivery platform 114 may come from external systems. For example, an e-commerce system may provide data on which users purchased a product, where such data is correlated by delivery platform 114 to the documents sent to the users. Thus, delivery platform 114 can update document records in user action reports store 118 to reflect user actions on documents.

Further, delivery platform 114 is configured to generate reports on templates using the document records associated with the templates. The reports can include various performance metrics, which may differ according to type of template, target audience, channel, or other factors. To provide an example, one embodiment of an email delivery platform tracks one or more of: the number of emails generated from a template submitted for delivery or sent, the number of sent emails generated from a template that were read, the read rate of sent emails generated from the template, number of emails generated from the template that were opened, the open rate of sent emails generated from the template, number of emails generated from the template in which links were clicked, the link click rate for sent emails generated from the template, number of purchases that resulted from emails generated from a template, purchase rate for sent emails generated from a template. Delivery platform 114 stores monitored metrics and reports in delivery user action reports store 118 and provides monitored metrics or reports on templates to server 112 for storage in document event dataset 123.

Analytics engine 116 uses layout information dataset 122 and document event dataset 123 when analyzing editing event data to provide suggested layout information for an editing action.

According to one embodiment, analytics engine 116 identifies, from knowledge store 120, a set of candidate templates based on template selection criteria. The template selection criteria, according to one embodiment, are based on one or more of: template metadata or template element metadata from the editing event data. In a more particular embodiment, the template selection criteria include one or more of: a template identifier (e.g., template id number or template name), template type, channel, target audience, template description, template element identifier (e.g., template element id number or template element name), template element type, template element description.

For example, for an editing event that applies to the overall template, such as creating a new template of a template type, analytics engine 116 of one embodiment selects candidate templates based on matching one or more of: template type, channel, target audience, or template description. For an editing action that applies to a template element, analytics engine 116, in one embodiment, selects templates based on matching one or more of: template type, channel, target audience, or template element description and that include one or more of: the same template element subject to the editing action or the same template element type subject to the editing action. In an even more particular embodiment, the template selection criteria comprises the template type and at least one of a template element identifier (e.g., template element id number or name) or template element type.

Analytics engine 116 analyzes document event data from document event dataset 123 for the candidate templates and determines the template from the candidate templates that meets a performance metric goal, such as the template with a greatest performance metric, and selects that template as a layout source template. For example, analytics engine 116, according to one embodiment, identifies the layout source template as the candidate template with one or more of: greatest number of documents read, greatest document read rate, greatest number of documents opened, greatest open rate, greatest number of documents in which links were clicked, greatest link click rate, greatest number of purchases, greatest purchase rate.

For an editing event that applies to an overall template layout, analytics engine 116 selects the overall template layout associated with the layout source template in knowledge store 120 as suggested layout information. For an editing event that applies to a template element, analytics engine 116 selects the layout information for the same template element or same template element type from the layout information associated with the layout source template in knowledge store 120.

According to another embodiment, analytics engine 116 comprises a data parser 124 that parses document event dataset 123 and, in some cases, layout information dataset 122 to identify the most effective templates considering template selection criteria and performance metrics. Non-limiting examples of template selection criteria and performance metrics are discussed above.

In one embodiment, data parser 124 comprises a reports parser that parses reports from delivery platform 114. For example, for an editing action that applies to the overall template, such as creating a new template of a template type, the template layout recommendation system, in one embodiment, data parser selects candidate templates based on matching one or more of template type, channel, target audience, or template description specified for the template being created. For an editing action that applies to a template element, data parser 124, in one embodiment, selects candidate templates based on matching one or more of: template type, channel, target audience, or template description and that include one or more of: the same template element subject to the editing action or the same template element type of the template element subject to the editing action.

Data parser 124 identifies the n most effective templates from the candidate templates based on a performance metric. For example, analytics engine 116 selects the n candidate with the greatest numbers of documents read, the n candidate templates with the greatest numbers of documents read, the n candidate templates with the greatest numbers of documents opened, the n candidate templates with the greatest documents opened rate, the n candidate templates with the greatest numbers of click events, the n candidate templates with the greatest link click rates, the n candidate templates with the greatest numbers of purchases, the n candidate templates with the greatest purchase rates. In some embodiments, analytics engine 116 considers multiple performance metrics in selecting the most effective templates.

A template document analyzer 126 invokes the services of server 112 to convert the n templates identified by data parser 124 for a performance metric (including a combination of performance metrics in some embodiments) to documents of a desired format. For example, document analyzer 126 invokes the services of server 112 to convert each of the n templates identified data parser to a respective PDF document.

The template document analyzer 126 then analyzes the n documents to identify similarities in layout for the documents as a whole or template elements. In some embodiments, document analyzer 126 uses third-party applications or services to analyze the document. For example, document analyzer 126 may use existing PDF analysis software to determine the similarities in content and layout in documents generated from the n templates. If the overall template layout information is the same or similar for one or more layout parameters between the n templates (for example, based on rules), layout information from the n templates can be used as the suggested layout information for an editing action that applies to the overall template. The suggested layout information may include suggestions for all the overall template layout parameters or some subset thereof depending on configuration and which parameters have similar values between the n templates. For example, if the page size is the same between the n templates, but the background color is not, the page size from the n templates may be used as the suggested page size for the template being designed.

If the layout is the same or similar for one or more layout parameters between the n templates (for example, based on rules) for template element or template element type, the layout information for the template element or template element type can be selected as the suggested layout information for the template element that is the subject of the editing action. In some embodiments, if the layout information is the same or similar for one parameter across the n templates, but not others, the suggested layout information will include suggested layout information for the same/similar parameters, but not the others. For example, if the size of a template element of a template element type is the same or similar across the n templates, but the position is not, the suggested layout information for the template element or template element type may include a suggested size, but not position (or in another embodiment include a default position).

Similarity can be determined in a number of ways. According to one embodiment, if the variation in size, position, color or other layout parameter of documents or template elements rendered in the documents generated from the n templates is within a threshold variation, the layout parameter can be considered similar for the n templates. The layout information for that parameter can be selected from one of the n templates as the suggested layout information for that parameter. In one embodiment, for example, analytics engine 116 selects the layout information from the candidate template with the greatest performance metric as the suggested layout information for the layout parameter.

In addition, or in the alternative, analytics engine 116 comprises a machine learning model 128 that is trained using a set of training data that includes templates with their layout information for contained elements, template metadata, and performance metrics. In some embodiments, machine learning model 128 is also trained using overall template layout information. Thus, machine learning model 128, according to one embodiment, represents templates, contained data elements, and layout information.

According to one embodiment, machine learning model 128 is trained using training data from layout information dataset 122 and data from document event dataset 123. The training data includes overall template features, contained template element features, and performance metric features.

Overall template features, according to one embodiment, comprise features that apply to the template, such as template metadata features or overall template layout features. In an even more particular embodiment, overall template features include template metadata features. Template metadata features, according to one embodiment, include features representing one or more of: template (e.g., by template id number, template name, or another identifier of template), template type, which may include subtypes in some embodiments, channel, target audience, or template description. The template metadata features used in training, according to one embodiment, include features representing at least one of the template or the template type. Overall template features, according to one embodiment, comprise overall layout features. The overall layout features used in training, according to one embodiment, include features representing one or more of: page size, orientation, or background color.

Contained template element features, according to one embodiment, include one or more of: a template element metadata feature or template element layout feature. Template element metadata features represent one or more of: the template element (e.g., by template element id number, template element name, or another identifier of the template element) or template element type. Template element layout features for a contained template element, according to one embodiment, include features representing one or more of: the template element location, the template element size, font of text in the template element, font size of text in the template element, color of text in the template element, background color of the template element, background image for the template element, or colors of objects contained in the template element, or whether the layout information for the template element was a suggested layout. According to one embodiment, the contained template element features for a template element used in training include at least features representing one or more of: the template element or the template element type and at least one template element layout feature.

Performance metric features for a template include one or more of: the number of documents generated from the template that resulted in a specified action or the rate of the specified action with respect to documents generated from the template. The specified action, according to one embodiment, includes one or more of: a document open action, a document read action, a link click action, or a purchase action. Thus, according to a more particular embodiment, the performance metric features for a template include features for one or more of: the number of documents generated from the template that were read, the number documents generated from the template that were opened, the number of documents generated from the template that resulted in link clicks by target end users, the read rate of documents generated from the template, the open rate of documents generated from the template, the link click rate for documents generated from the template, the number of documents generated from the template that resulted in a purchase, the purchase rate for documents generated from the template. Other example performance metric features include but are not limited to: the number of documents generated from a template that were sent to target end users, the number of documents generated from a template that were submitted for delivery to target end users, the number of documents generated from a template that were delivered to target end users.

In some embodiments, the overall template features, the performance metric features, and the contained template element features of the template elements contained in the template are represented as one or more feature vectors for the template. The feature features for a plurality of templates are used to train machine learning model 128 to output suggested layout information.

Analytics engine 116 receives editing event data and extracts editing event features from the editing event data. The editing event features, according to one embodiment, represent one or more of: template metadata or template element metadata from the editing event data. In a more particular embodiment, the editing event features include one or more of: the template (e.g., by template name, template id, or another identifier of the template), a template type, channel, target audience, a template element (e.g., by template element name, template element id, or another identifier of template element), or template element type. Analytics engine 116 inputs the editing event data as a feature vector. In some embodiments, the feature vector includes an indication of one or more performance metrics for which to optimize the layout. Furthermore, in some embodiments, the feature vector for the editing event includes template element features for other template elements already selected for the template being edited.

Machine learning model 128 is trained to output a suggested layout for the input editing event features. More particularly, machine learning model 128 is trained to output the suggested layout information for the editing event that is predicted to be the most effective layout information for one or more performance metrics.

Analytics engine 116 returns the suggested layout information to server 112 and server 112 provides the suggested layout information to template design application 110, which displays the suggested layout information as a recommended layout for the editing action. If the user's acceptance of or rejection of the suggested layout information is recorded in some embodiments and can be used for retraining machine learning model 128.

FIG. 2A, FIG. 2B, FIG. 2C, FIG. 2D, and FIG. 2E illustrate one embodiment of creating a template via a template design application 110. In this embodiment, the template designer is presented with an interface page 200 in which the template designer can create a new template. When a designer creates a new template, the template designer specifies template metadata such as the template name, template type, and template description. The template type, according to one embodiment, refers to the use type (e.g., introduction letter, offer letter, invoice, etc.). In multichannel embodiments, the user may designate that the template is for use on a particular communications channel. The user may also specify the target audience where, for example, the target audience is a named entity in the system.

Here, if the user selects to create the template, the system assigns a unique template id to the template. Further, template design application 110 sends editing event data 204 for the template creation event to server 112. Template design application 110 sends editing event data 201 to server 112, which stores the template metadata in knowledge store 120. As discussed, server 112 invokes analytics engine 116, which analyzes the editing event data, for example, one or more of: template name, channel, template type, or template description, to provide suggested layout information for the editing action.

Figure 2A:
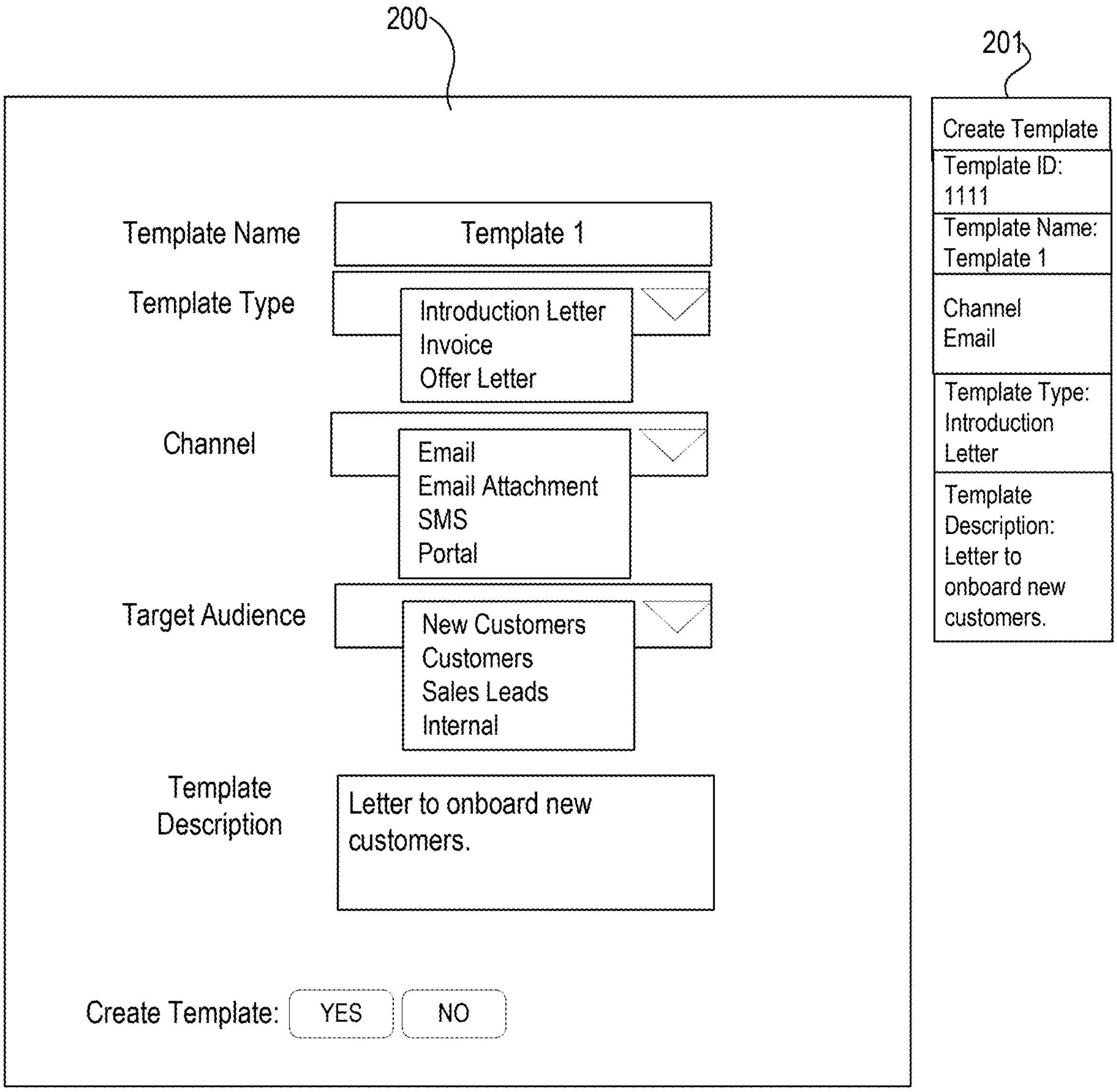
Figure 2B:
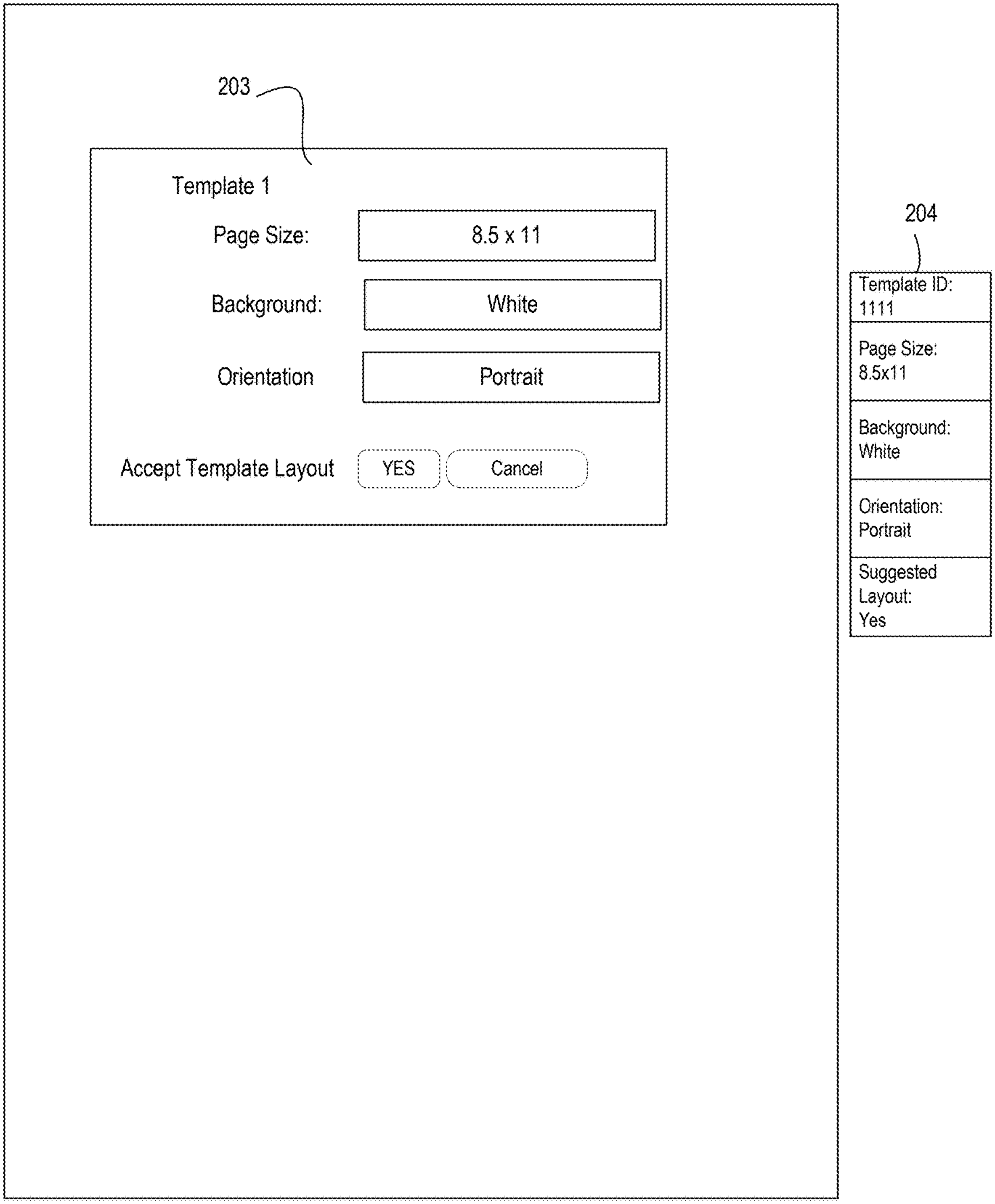

Turning to FIG. 2B, template design application 110 presents the template designer with an overall template layout control 203 initially populated with the suggested overall template layout information. The template designer can accept the suggested template layout information or select different template layout information. When the designer indicates that a layout is acceptable, template design application 110 sends editing event data 204 to server 112 for storage in knowledge store 120. The editing event data 204 includes template metadata, final overall template layout information, and indication of whether the template layout information was the suggested template layout information. In this example, the template metadata includes just the template metadata needed so that server 112 can associate editing event data 204 with the appropriate template.

Figure 2C:
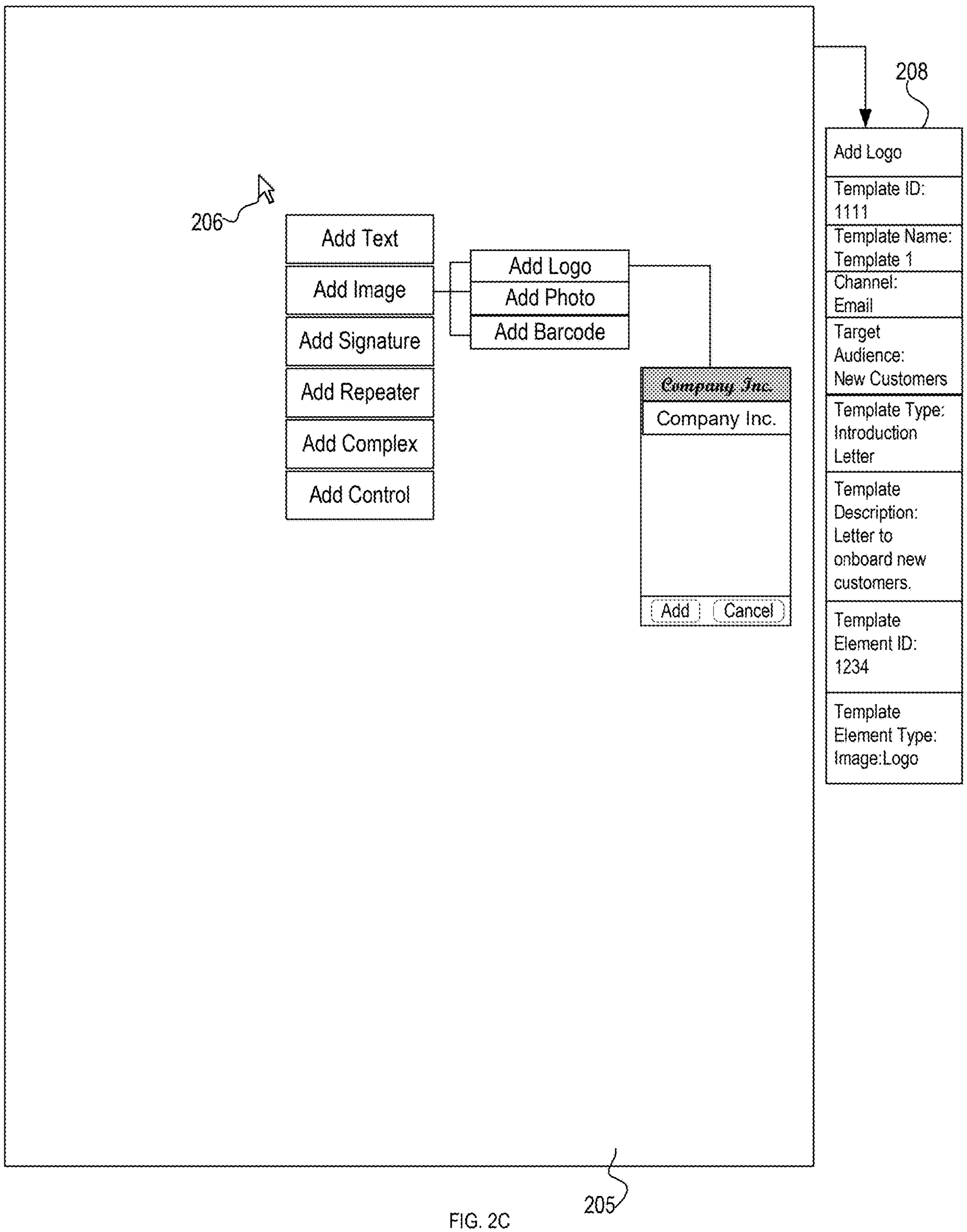

Turning to FIG. 2C, the template designer can add template elements to the new template 205. In this example, template design application 110 supports a number of user editing actions, such as, but not limited to: add/edit text (including subtypes), add/edit image (including subtypes), add/edit signature, add/edit button, add/edit complex object (including subtypes), add/edit repeater element (including subtypes). Here, template design application 110 presents the designer with a series of menus 206 (e.g., based on the user right-clicking on template 205 in the interface, selecting an item from a menu, or taking another action) through which the designer user has selected to add a logo element to template 205, including selecting the logo element.

Based on user interaction with its graphical user interface, template design application 110 captures an "add logo" editing event and sends event data 208 for the event to server 112. Server 112 invokes analytics engine 116, which analyzes the editing event data for example, one or more of: the template name, channel, template type, template description, template element id, or template element type, and provides suggested layout information for the editing action. In one embodiment, the analysis by analytics engine 116 incorporates at least the template type and the template element type.

Event data 208, in this example, includes template metadata and template element metadata. In some embodiments, event data 208 includes all the template metadata and template element metadata needed for analysis of the event. In other embodiments, server 112 augments the event data with data from knowledge store 120. For example, if analytics engine 116 uses the template type in its analysis, but event data 208 only includes the template id, then server 112 can augment the event data with the template type associated with the template id in knowledge store 120.

Analytics engine 116 returns suggested layout information for the editing action to server 112, which provides the suggested layout information to template design application 110 for presentation to the user. According to one embodiment, the suggested layout information for the logo element includes the position and size of the element.

Figure 2D:
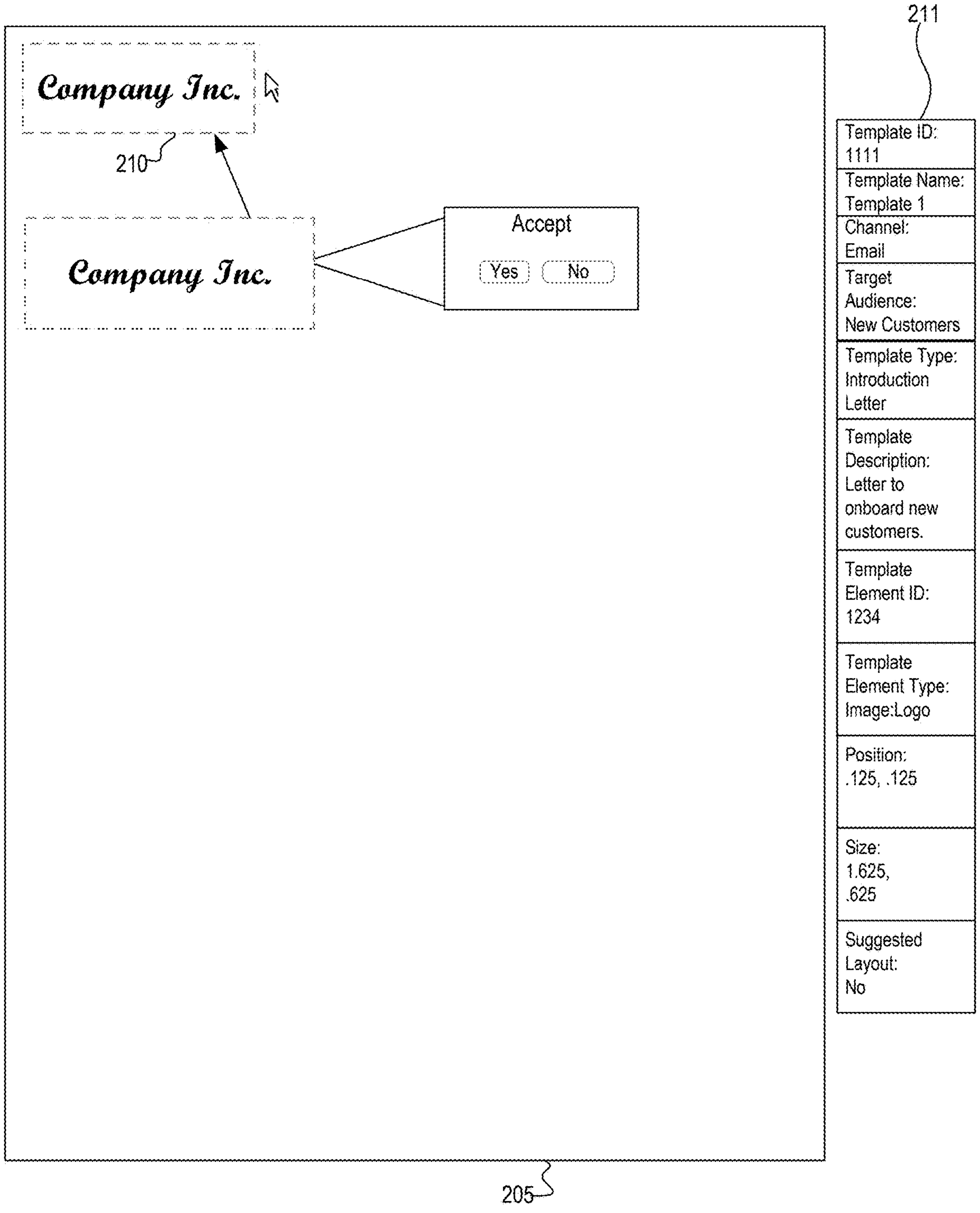

Turning to FIG. 2D, template design application 110 presents the suggested layout information to the user. In this example, template design application 110 adds logo template element 210 to template 205 with logo template element 210 positioned and sized as suggested by the suggested layout information, though the suggested layout information could be presented in a variety of other ways in other embodiments. The user can accept the suggested layout information or move, resize template element 210 or otherwise change the layout template element 210. For example, here the user has moved and resized template element 210.

When the user indicates that they are satisfied with the layout of template element 210, such as by moving on to another template element, or expressly indicating that they are done editing template element 210 via a menu option, or at the occurrence of another predefined event, template design application sends editing event data 211 to server 112 for storage in knowledge store 120. Editing event data 211 includes template metadata, template element metadata, template element layout information, and an indication that the template element layout information selected by the user is not the template element layout information suggested by analytics engine 116.

Figure 2E:
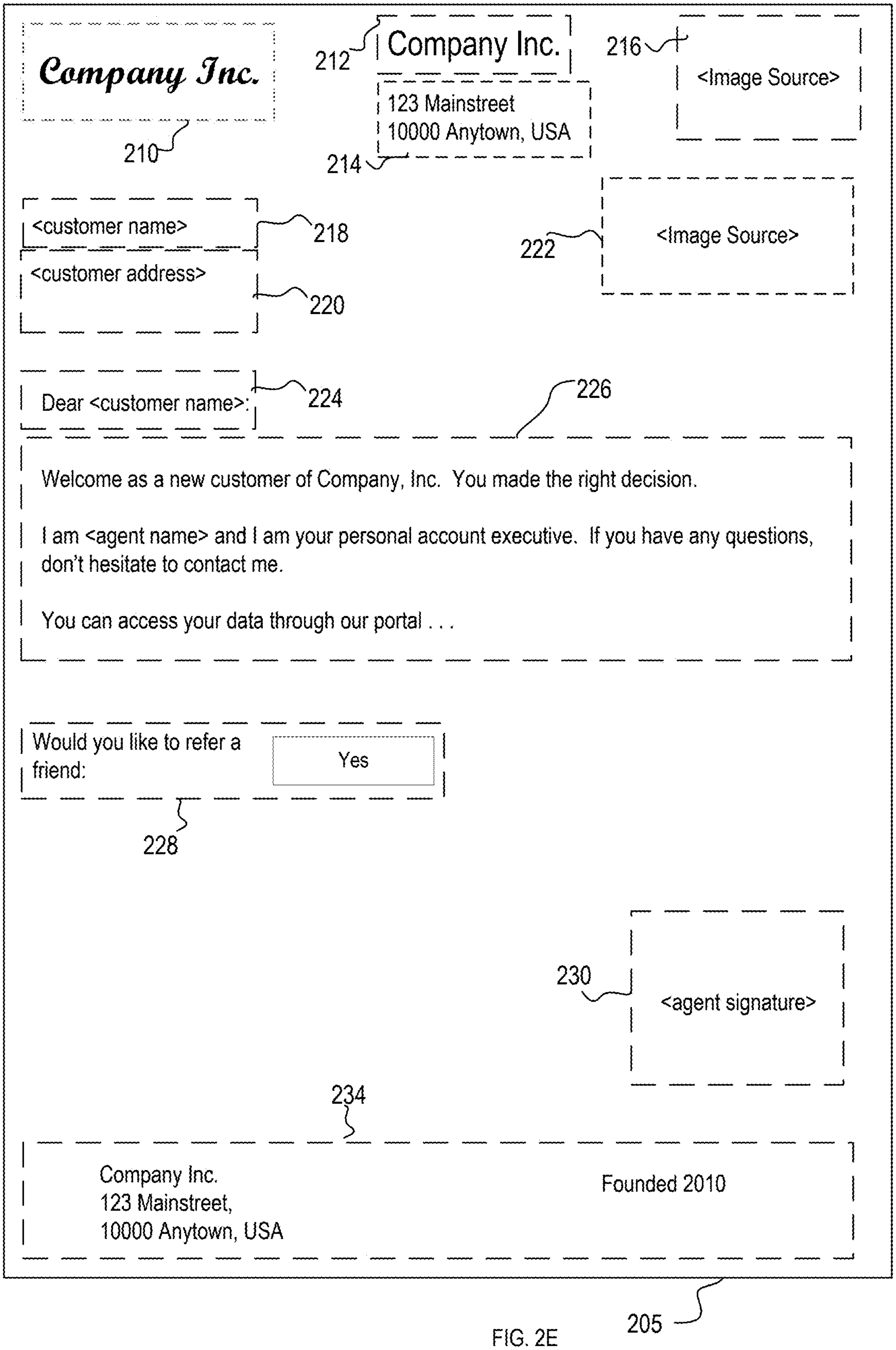
Figure 3A:
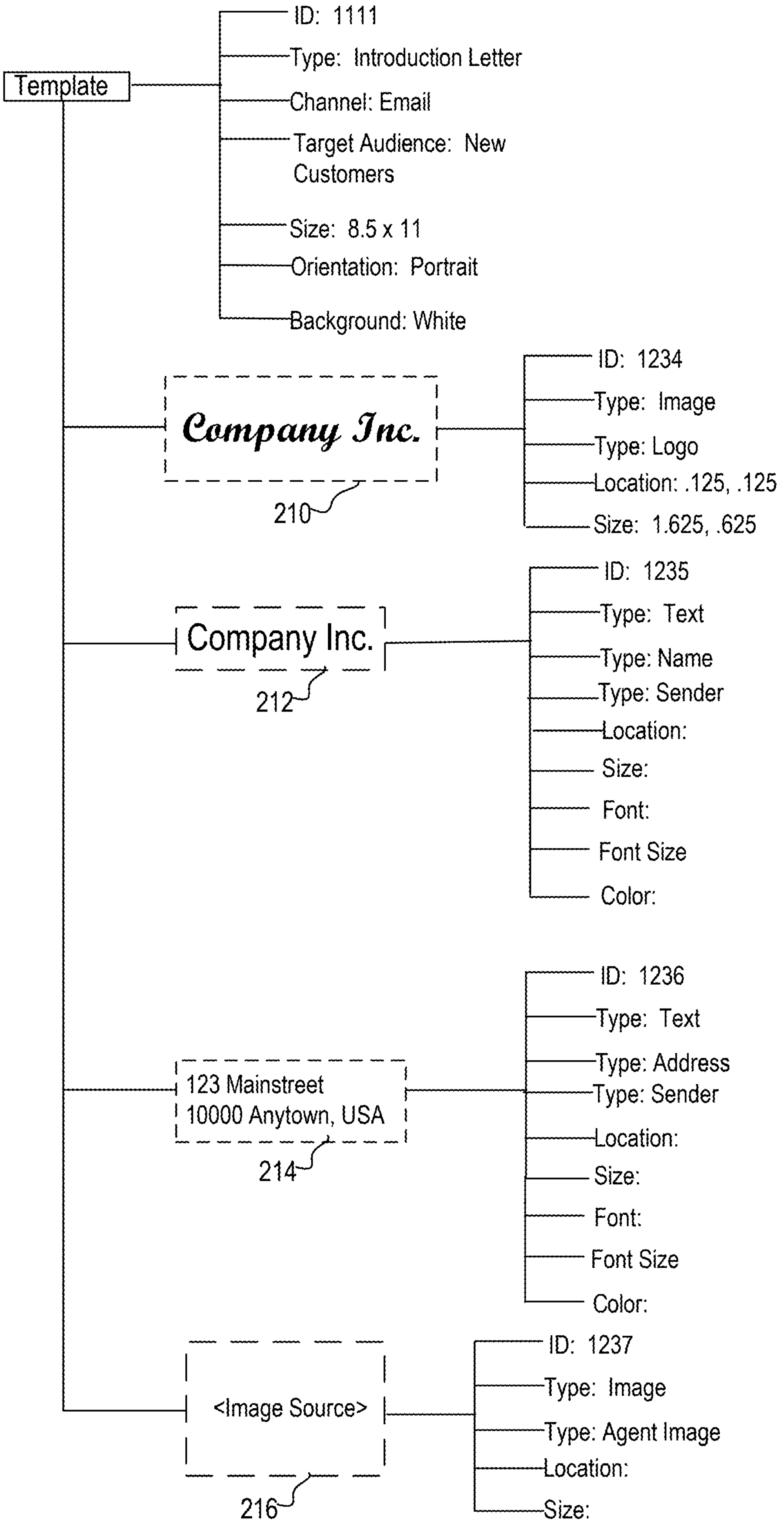
FIG. 3A, FIG. 3B, and FIG. 3C are diagrammatic representations of one embodiment of metadata and layout information for a template and contained template elements.
Figure 3B:
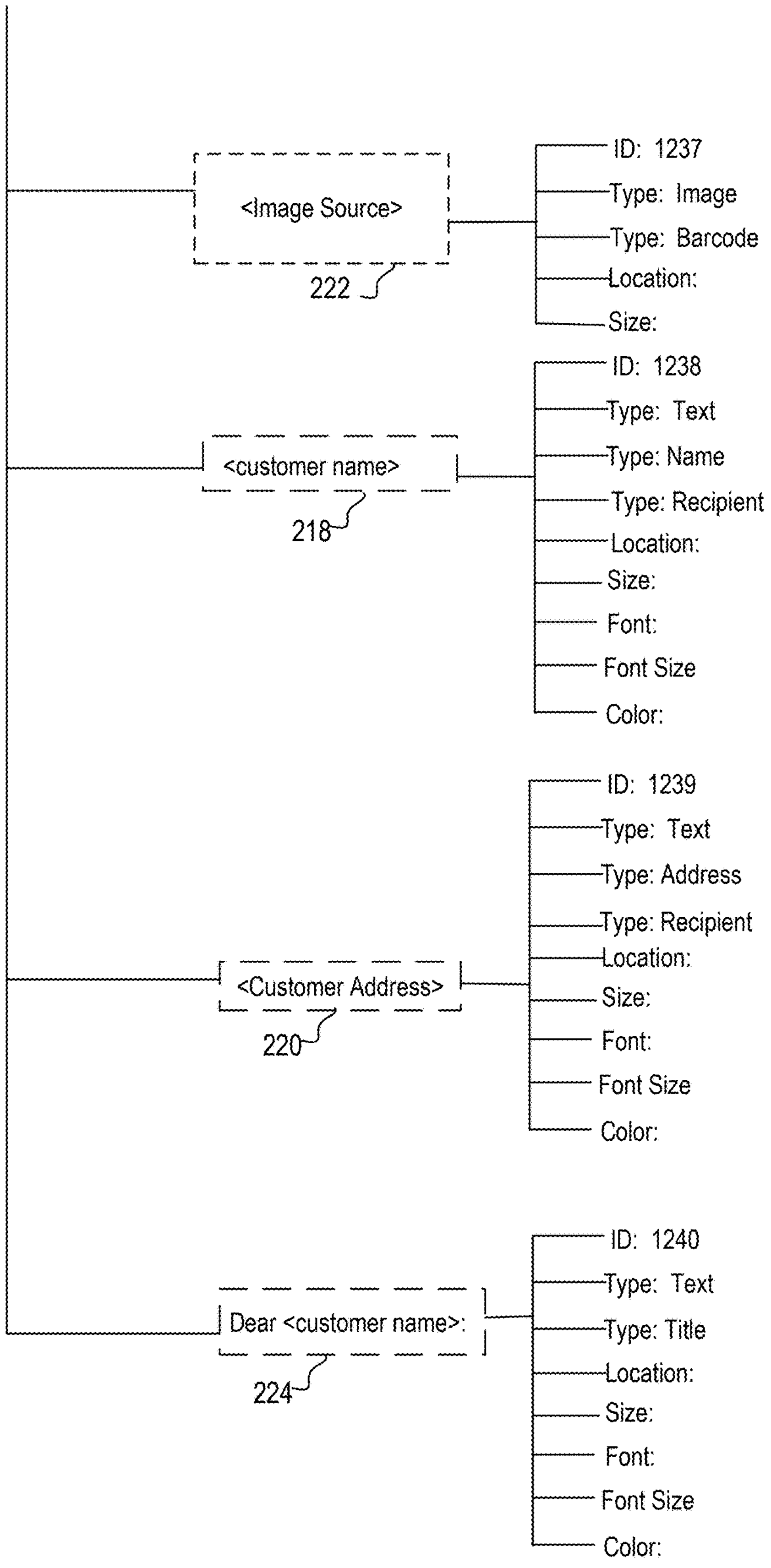
Figure 3C:
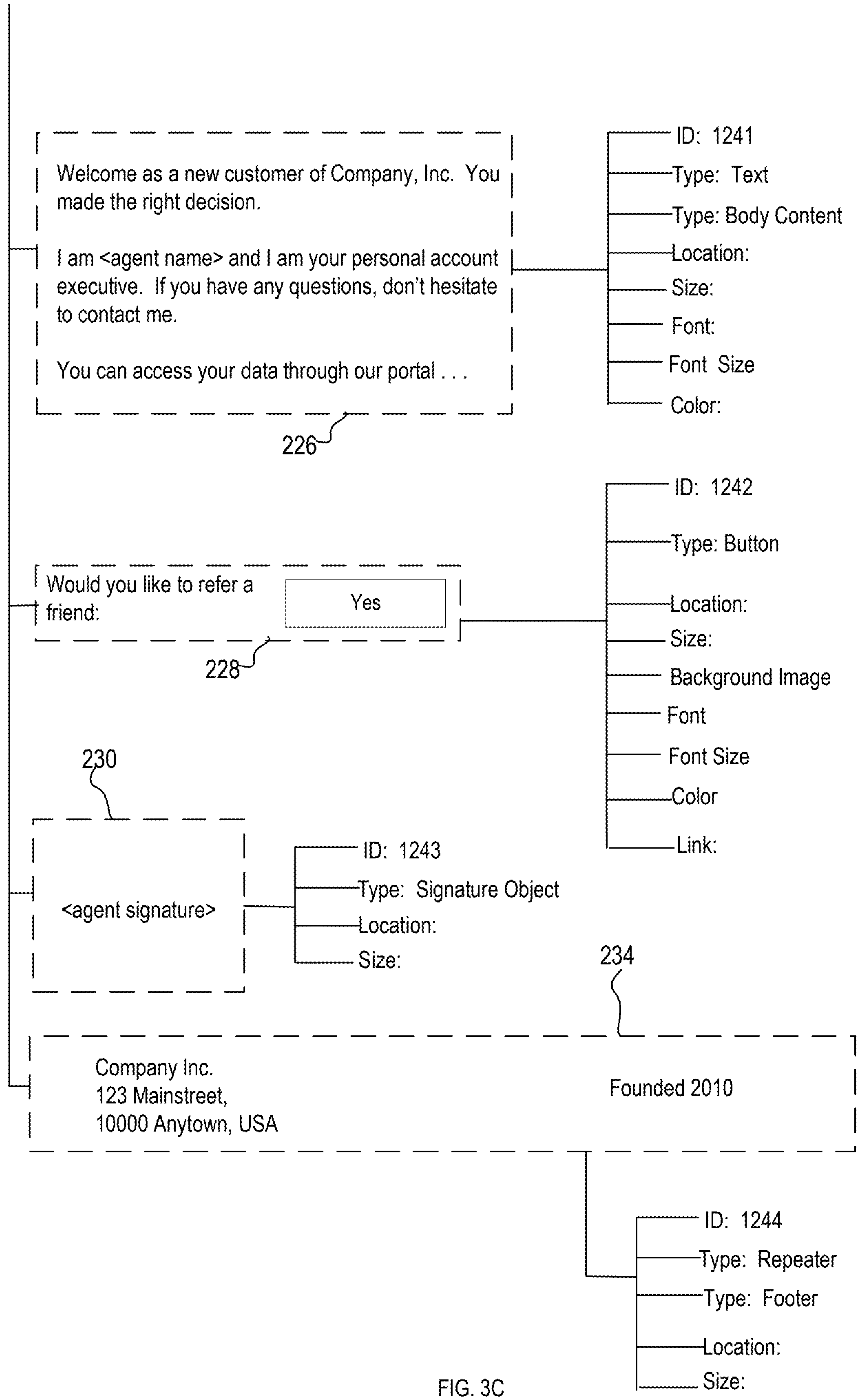

FIG. 2E illustrates an embodiment of a completed template 205. In the embodiment of FIG. 2E, template 205 includes logo template element 210, sender name element 212, sender address element 214, agent image element 216, recipient name element 218, recipient address element 220, barcode element 222, title element 224, body content element 226, button element 228, signature element 230, footer element 234. According to one embodiment, template 205 and the contained template elements are each embodied as a respective object having unique id and other properties.

As discussed above with respect to editing event data 201, editing event data 204, event data 208 and event data 211, template design application 110, in some embodiments, sends editing event data when the designer selects to perform an add/edit action and when the designer indicates completion of the add/edit action. In addition, or in the alternative, template design application 110 sends final layout event data for a template or contained template elements when the designer indicates that the template is complete. For example, in some embodiments, template design application 110 may wait until the designer saves template 205 or indicates that template 205 is complete to send editing event data 204 and editing event data 211 to server 112 for storage in knowledge store 120.

Some template elements include variables to be replaced by sourced data. For example, agent image element 216 specifies an image source from which to fetch an agent's image when generating a communication. As another example, recipient name element 218 indicates that the text element is to be populated with values for a variable <customer name>.

FIG. 2F is a diagrammatic representation of a document 250 produced from template 205 of FIG. 2E. In this example, the document is an email body. In this example, server 112 processes template 205 and replaces variables with sourced data when generating document 250. Server 112 submits document 250 to delivery platform 114 with template metadata of template 205 and information about the intended target user, such as their email address, to facilitate delivery.

Further, FIG. 3A, FIG. 3B, FIG. 3C (collectively, FIG. 3) illustrate an example embodiment of template metadata and overall layout information associated with template 205 and the template element metadata and layout information for the template elements contained in template 205 (specific values for the layout parameters are not shown for all template elements). In one embodiment, the associations between the contained template elements and the template are maintained in the template metadata (e.g., as a list of associated template elements). In addition, or in the alternative, the associations between the contained template elements and the template are maintained in the template element metadata—for example as a reference to the template in which the template element is contained. Templates and template elements can have a variety of associated metadata and layout parameters and the metadata and layout information illustrated in FIG. 3 is provided by way of example and not limitation.

Figure 4:
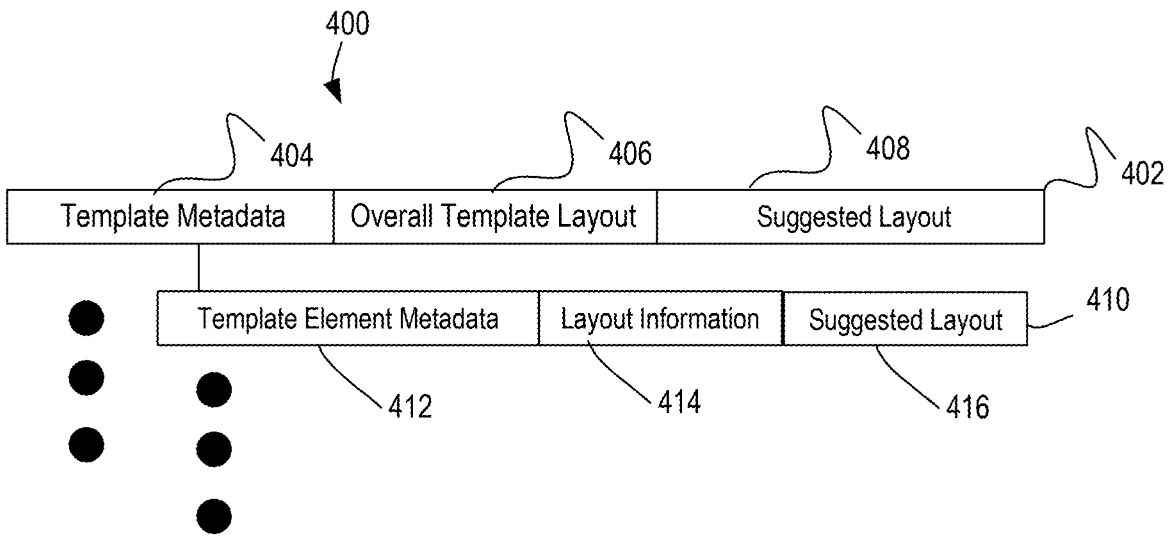
FIG. 4 is a diagrammatic representation of one embodiment of example information in a layout information dataset.

FIG. 4 is a diagrammatic representation of one embodiment of example information in a layout information dataset 400, such as layout information dataset 122, for a plurality of templates. For each of the plurality of templates represented, layout information dataset includes template information 402 for the overall template and template element information 410 for each template element contained in the template. Template element information 410 for each contained template element is associated in layout information dataset 400 with the template metadata for the template that contains the template element.

Template information 402, according to one embodiment, includes template metadata 404, overall template layout information 406, and an indication 408 of whether the overall template layout information 406 is the suggested layout information that was suggested for the template. According to one embodiment, template metadata 404 for a template includes one or more of: a template identifier, a template type, which may include one or more subtypes in some embodiments, a channel type, a target audience, or a template description. According to an even more particular embodiment, template metadata 404 comprises a template identifier and a template type. In some embodiments, template metadata 504 identifies the contained template elements.

According to one embodiment, template element information 410 includes template element metadata 412, template element layout information 414, and an indicator 416 of whether the template element layout information is the suggested layout information that was suggested for the template element. The template Template element metadata 412, according to one embodiment, includes one or more of: the template element identifier, a template element type (including subtypes in some embodiments), or a template element description. According to an even more particular embodiment, template element metadata 412 comprises a template element identifier (e.g., template element id or template element name) and template element type. Template element metadata 412 for a template element includes, in some embodiments, an identifier for the template in which the template element is contained.

Figure 5:
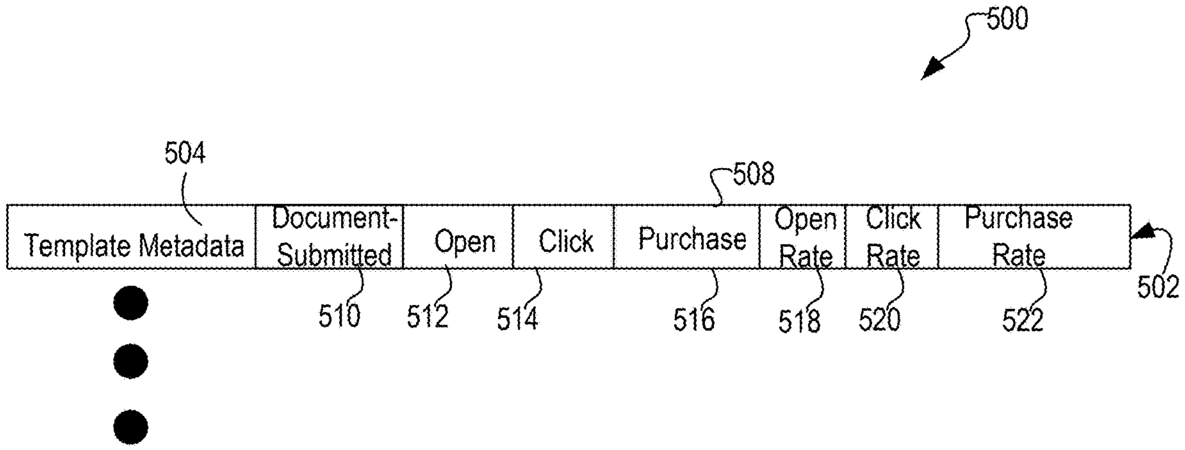
FIG. 5 is a diagrammatic representation of one embodiment of a document event dataset.

Turning to FIG. 5, one embodiment of a document event dataset 500 for events captured on documents generated from templates is illustrated. Document event dataset 500 is one embodiment of document event dataset 123. For each template represented in document event dataset 500 includes document event information 502. The document event information 502 for a template includes template metadata 404 and performance metric data 508 associated with the template. Template metadata 504 includes information about the template from which the document was generated. Even more particularly, according to one embodiment, template metadata 404 included in the document event information 502 for a template includes at least a subset of the template metadata 404 for the template from which the document was generated. In a more particular embodiment, the template metadata 504 included in the document event information 502 for documents generated from a template includes at least an indicator of the template from which the document generated, such as the template identifier.

Performance metrics data 508 comprises, according to one embodiment, statistics on specified actions including, in some embodiments, user actions. Examples of specified actions include, but are not limited to, generating a document, submitting a document for delivery, opening or reading of a document, clicking on a link in a document, purchasing a product referenced in a document. Statistics on specified actions captured for documents generated from a template are associated in document event dataset 500 with template metadata for the template from which the documents were generated.

In the example of FIG. 5, performance metric data 508 includes a document-submit event parameter 510 to track the number of documents generated from the template submitted for delivery, a document open event parameter 512 to track the number of documents generated from the template that were opened by target end users, a link-click event parameter 514 to track the number of documents generated from the template in which links were clicked by target end users, and a purchase event parameter 516 to track the number of purchases that resulted from documents generated from the template, open rate parameter 518 to track the open rate for documents generated from the template, link click rate parameter 520 to track the link click rate for documents generated from the template, and purchase rate parameter 522 to track the purchase rate for documents generated by the template.

In one embodiment, server 112 creates a document event record for template 205 at the occurrence of a specified event, such as server 112 receiving template 205 from template design interface 110. When server 112 submits document 250 of FIG. 2F to delivery platform 114 for sending by email, server 112 records an email-submit action in association with the template metadata for template 205 in knowledge store 120. For example, each time that server 112 submits a document generated from template 205 to delivery platform 114 for delivery to an end user, server 112 increments document-submit event parameter 510 in the document event information 502 recorded for template 205. Further, over time, server 112 collects performance metrics for template 205 such as the number of document open events associated with template 205 to update open event parameter 512, the number of link-click events associated with template 205 link-click event parameter 514, and the number of purchase events associated with template 205 to update purchase event parameter 516. According to one embodiment, server 112 receives the values of these parameters in reports from delivery platform 114.

In one embodiment, server 112 also receives values for open rate parameter 518, link-click rate parameter 520, and purchase rate parameter 522 in a report from delivery platform 114. In another embodiment, server calculates the open rate for a template as the ratio of open events associated with the template to the number of document submit events associated with the template, calculates the link click rate for the template as the ratio of link click events associated with the template to the number of document submit events associated with the template, and calculates the purchase rate for the template as the number of purchase events associated with the template to the number of document submit events associated with the template.

As discussed, the document event data, including user action data, can be used to select recommended layout information. Thus, recommendations can evolve as new templates are utilized and additional document event data collected.

Figure 6A:
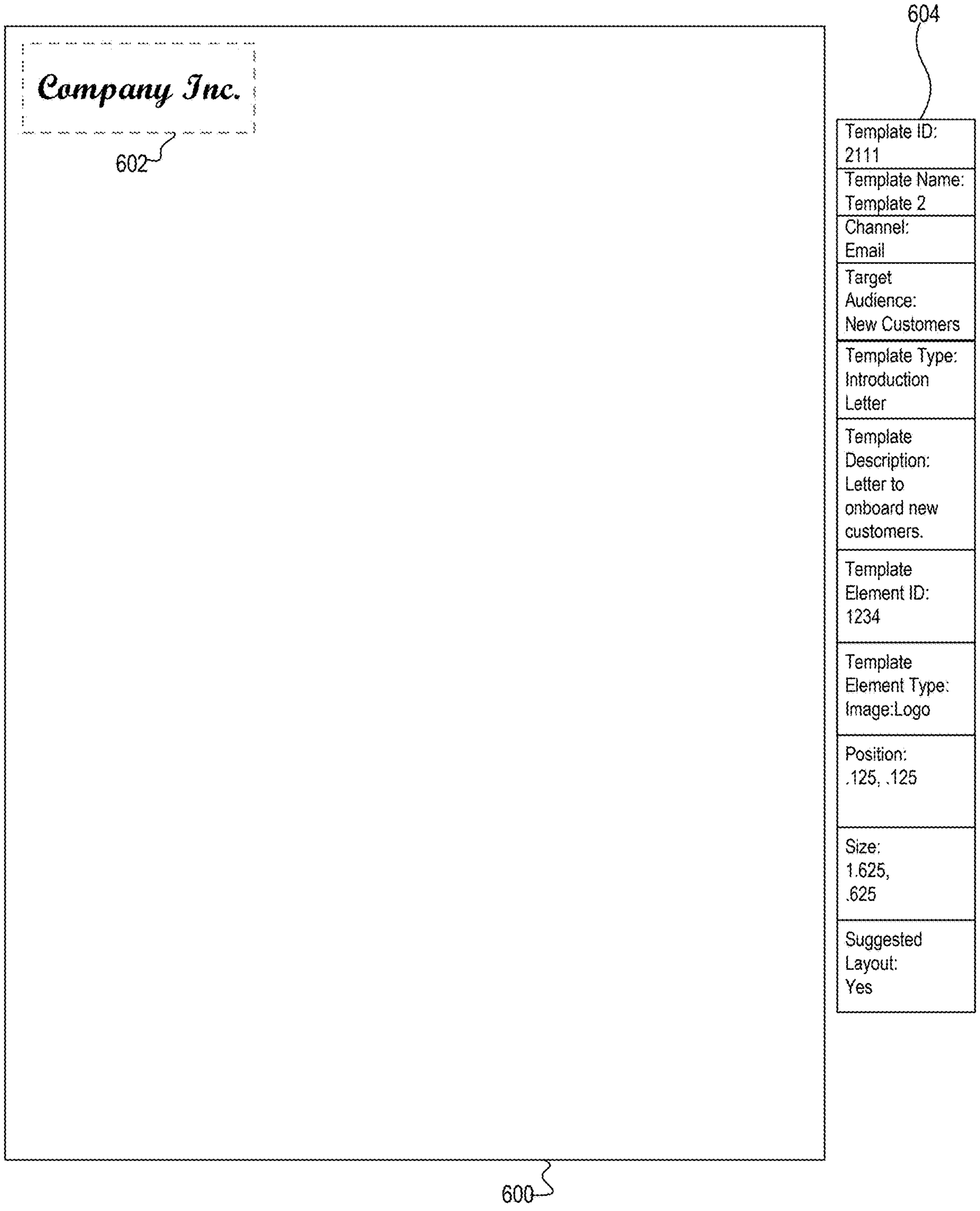
FIG. 6A and FIG. 6B are diagrammatic representations of one embodiment of editing a template.
Figure 6B:
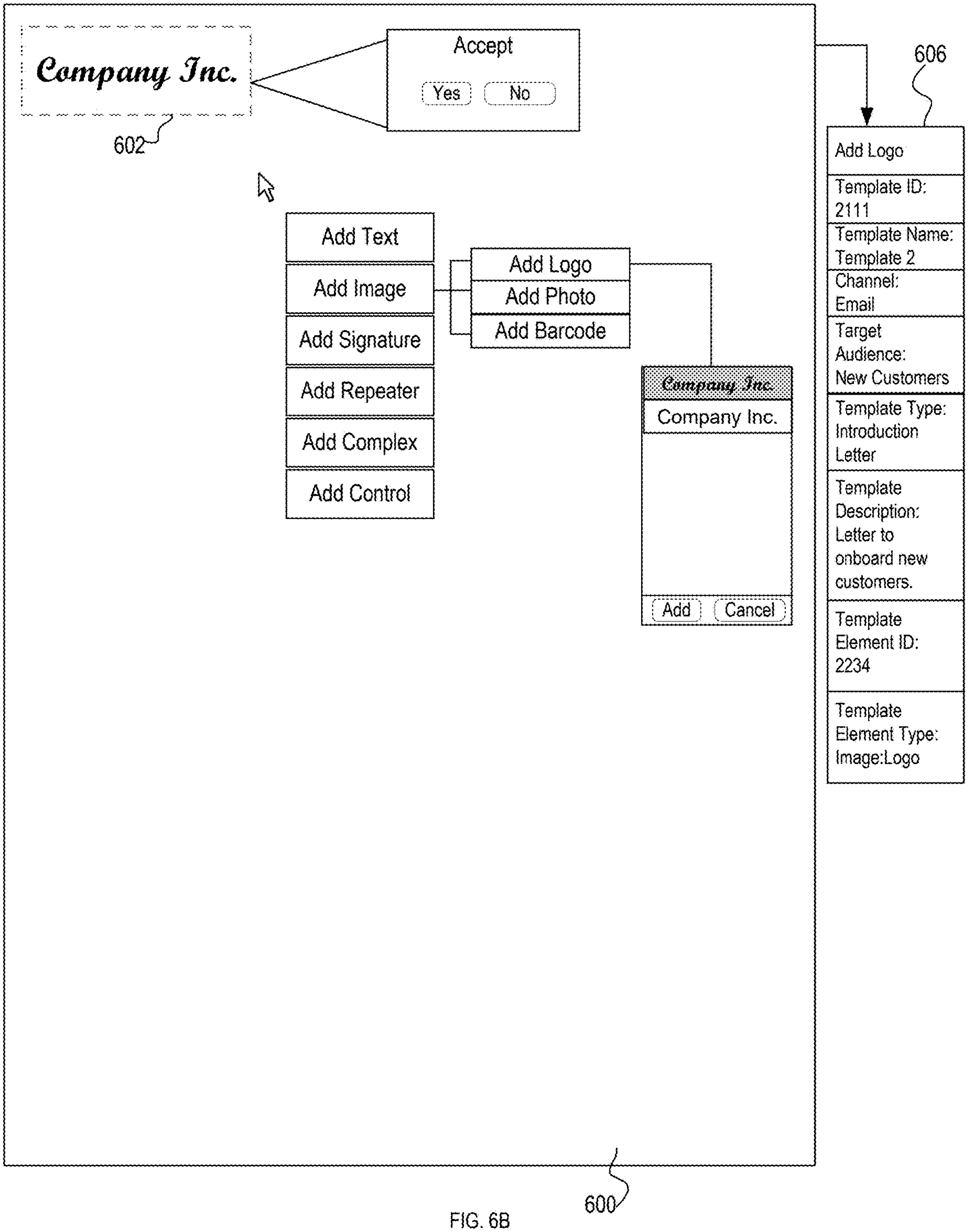

FIG. 6A is a diagrammatic representation of a step in a designer designing another "Introduction Letter" template 600. When the designer selects to add a logo template element to template 600, template design application 110 sends editing event data 604 to server 112. In this example, it is assumed that analytics engine 116 determines that template 205 is the appropriate layout source template to use and identifies the layout information for the "logo" template element 210 (e.g., identifies layout information 414 recorded for template element 210 of template 205) as the suggested layout information. Server 112 returns the suggested layout information. In this example, template design application 110 adds logo element 602 to template 600 with logo element 602 positioned and sized using layout information from logo template element 210. In this example, the suggested layout evolved based on the effectiveness of template 205 from when the designer designed template 205. Turning to FIG. 6B, if the designer accepts the suggested layout information, template design application 110 sends editing event information 606 to server 112.

Figure 7:
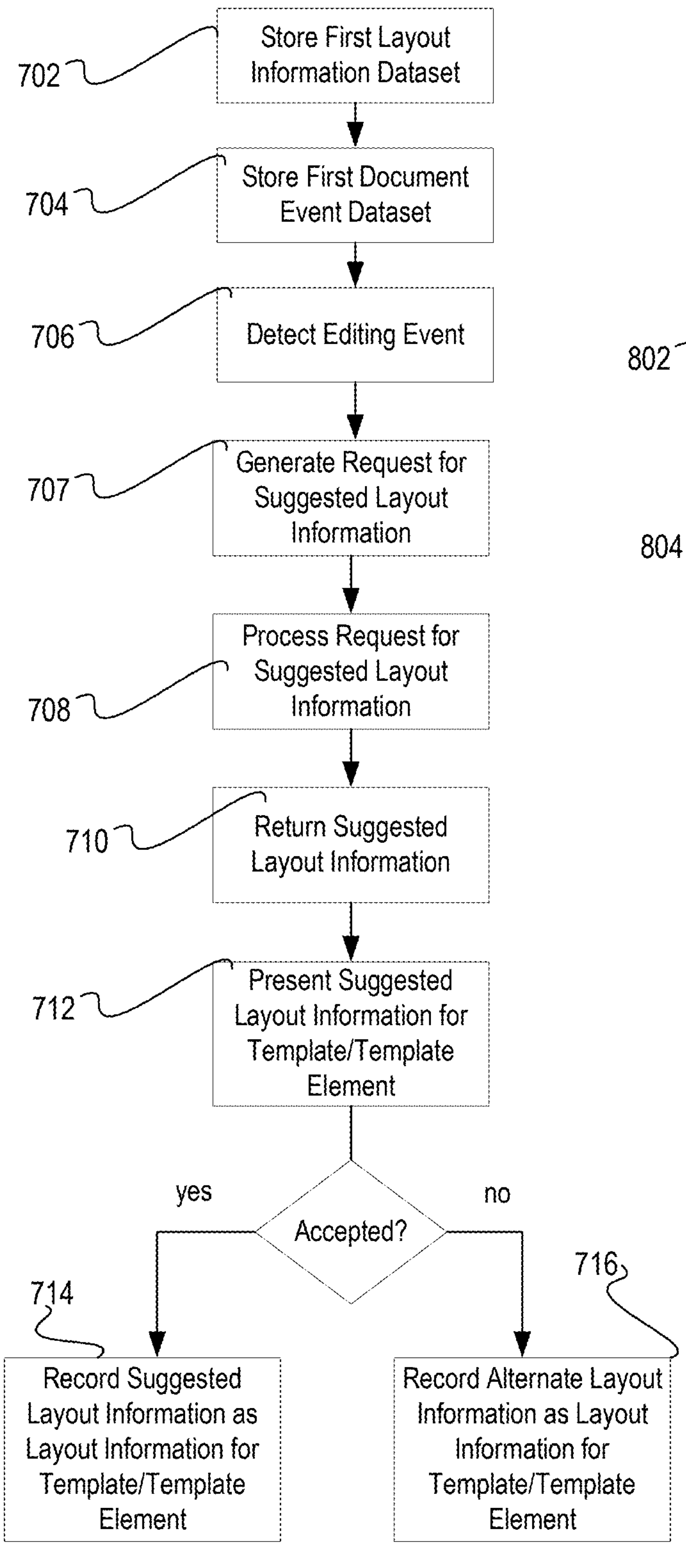
FIG. 7 is a flowchart illustrating one embodiment of a method for recommending template layout information.

FIG. 7 is a flowchart illustrating one embodiment of a method for recommending template layout information. Embodiments of FIG. 7 may be embodied, according to one embodiment, as computer executable instructions stored on a non-transitory computer readable medium.

At step 702, a template layout recommendation system stores a layout information dataset for a plurality of templates. The layout information dataset can include information for templates of multiple template types. For example, a template layout recommendation system stores a dataset (e.g., layout information dataset 400 of FIG. 4) that includes, for each of a plurality of templates, template information 402 for the template and associated template element information 410 for template elements contained in that template.

At step 704, a template layout recommendation system stores a document event dataset for events captured with respect to documents generated from the templates. More particularly, document event dataset comprises a user action dataset for events captured on documents electronically generated from the plurality of templates. The user action dataset includes statistics on specified actions on documents generated from the templates. Examples of specified user actions include, but are not limited to, opening or reading of a document, clicking on a link in a document, purchasing a product referenced in a document. The document event dataset may also include data on other types of actions, such as generating documents from a template, submitting documents generated from a template for delivery, sending documents generated from a template to end users, or delivery of documents generated from a template. For example, a template layout recommendation system stores, for each of a plurality of templates, template metadata for the template and performance metrics data.

At step 706, the template layout recommendation system detects an editing event associated with a template. At step 707, the template layout recommendation system generates a request for suggested layout information for the editing event. The request, according to one embodiment, includes editing event data that comprises template metadata for the template being edited. The editing event data includes, according to one embodiment, template metadata and, for editing actions with respect to template elements, template element metadata. According to one embodiment, the editing event data comprises one or more of: a template identifier or a template type and, for an editing action with respect to a template element, one or more of: a template element identifier or a template element type. Using the example of FIG. 1, template design application 110, at step 708, generates a request to server 112 that includes, according to one embodiment, template metadata, the template element type, and the template element identifier (if known) for the template element to be added or edited.

The template layout recommendation system processes the request to determine suggested layout information (step 708) and returns the suggested layout information (step 710). At step 712, the template layout recommendation system presents the suggested layout information to the designer (e.g., in the template design graphical user interface). The template designer can accept the suggested layout or select a new layout. If the designer accepts the suggested layout for the template/template element, the suggested layout information is recorded as the layout information for the template/template element with an indication that the designer accepted the suggested layout information (step 714). If the designer selects different layout information, the other layout information selected by the designer is recorded as the layout information for the template/template element along with an indication that the designer did not accept the suggested layout information.

FIG. 7 is merely illustrative and the disclosed subject matter is not limited to the ordering or number of steps illustrated. Embodiments may implement additional steps or alternative steps, omit steps, or repeat steps. Various steps may be repeated. For example, steps 706-716 may be repeated for multiple editing events.

Figure 8:
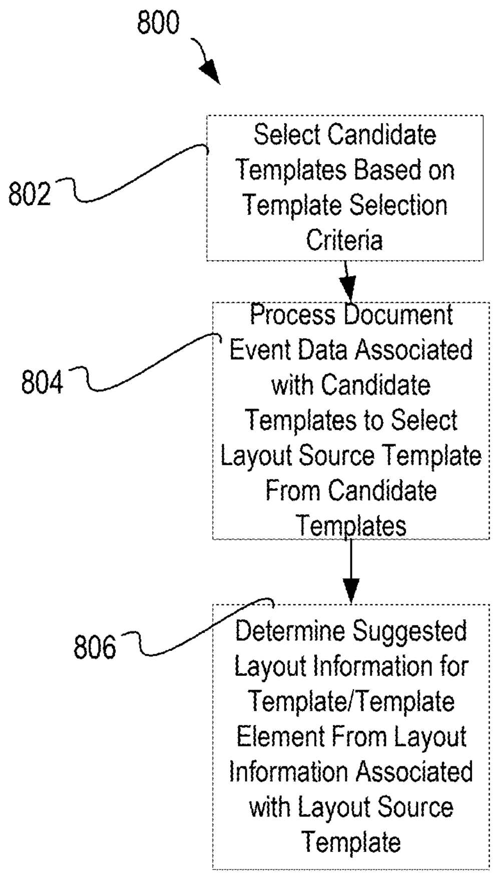
FIG. 8 is a flowchart illustrating one embodiment of a method for determining a recommended layout.

FIG. 8 is a flowchart illustrating one embodiment of a method 800 for recommending template layout information. Method 800 may be implemented as one embodiment of step 708. Embodiments of FIG. 8 may be embodied, according to one embodiment, as computer executable instructions stored on a non-transitory computer readable medium. Even more particularly, one embodiment of the steps of FIG. 8 may be implemented by analytics engine 116.

Processing the request for suggested layout information can include determining a second layout information dataset based on template selection criteria. The second layout information dataset, according to one embodiment, is at least a subset of the dataset stored at step 702. For example, the second layout information dataset, according to one embodiment, comprises the layout information associated with candidate templates or a selected template.

According to one embodiment, determining the second layout information dataset comprises determining a candidate set of templates based on the template selection criteria (step 802). The template selection criteria, according to one embodiment, include one or more of: template metadata or template element metadata from the editing event data. In a more particular embodiment, the template selection criteria include one or more of: a template identifier (e.g., template id number or template name), template type, channel, target audience, template description, template element identifier (e.g., template element id number or template element name), template element type, template element description.

For example, for an editing event that applies to the overall template, such as creating a new template of a template type, the template layout recommendation system, in one embodiment, selects candidate templates based on matching one or more of template type, channel, target audience, or template description specified for the template being created. For an editing action that applies to a template element, the template layout recommendation system, in one embodiment, selects templates based on matching one or more of template type, channel, target audience, or template description and that include one or more of the same template element subject to the editing action or the same template element type of the template element subject to the editing action.

The template layout recommendation system analyzes document event data from the document event dataset for the candidate templates and determines the template from the candidate templates that meets a performance metric goal across one or more performance metric parameters, such as the template with a greatest performance metric, and selects that template as a layout source template (step 804). For example, the template layout recommendation system identifies the layout source template as the candidate template with one or more of: greatest number of documents read, greatest document read rate, greatest number of documents opened, greatest document open rate, greatest number of documents in which links were clicked, greatest link click rate, greatest number of purchases, greatest purchase rate.

At step 806, the template layout recommendation system selects layout information from the layout source template as the suggested layout information. For an editing event that applies to an overall template layout, for example, the template layout recommendation system selects the overall template layout associated with the layout source template in knowledge store 120 as suggested layout information. For an editing event that applies to a template element, the template layout recommendation system selects the layout information for the same template element or same template element type from the layout information associated with the layout source template.

FIG. 8 is merely illustrative and the disclosed subject matter is not limited to the ordering or number of steps illustrated. Embodiments may implement additional steps or alternative steps, omit steps, or repeat steps. Various steps may be repeated. For example, steps 802-806 may be repeated for multiple editing events.

Figure 9:
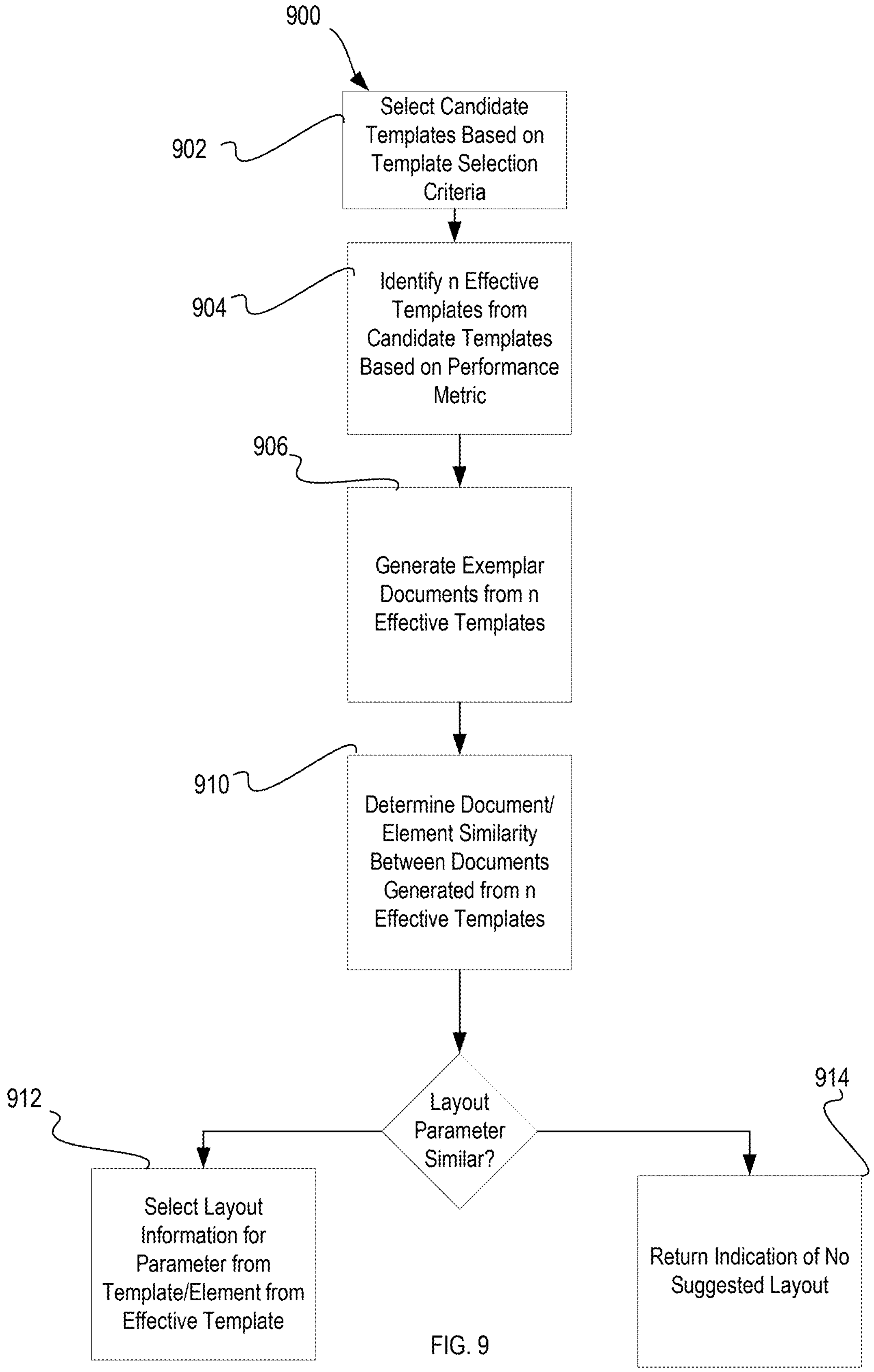
FIG. 9 is a flowchart illustrating another embodiment of a method for determining a recommended layout.

FIG. 9 is a flowchart illustrating one embodiment of a method 900 for recommending template layout information. Method 900 may be implemented as one embodiment of step 708. Embodiments of FIG. 9 may be embodied, according to one embodiment, as computer executable instructions stored on a non-transitory computer readable medium. Even more particularly, one embodiment of the steps of FIG. 9 may be implemented by analytics engine 116.

As discussed, processing the request for suggested layout information can include determining a second layout information dataset. The second layout information dataset, according to one embodiment, is at least a subset of the dataset stored at step 702. According to one embodiment, determining the second layout information dataset comprises determining the most effective templates based on the template selection criteria and a performance metric.

At step 902, the template layout recommendation system identifies candidate templates according to template selection criteria. Non-limited examples of template selection criteria are discussed above in conjunction with FIG. 8.

At step 904, the template layout recommendation system identifies the n most effective template from the candidate templates based on a performance metric associated with the templates. The performance metric, according to one embodiment, includes one or more of: the number of documents generated from a template that were read, the read rate of documents generated from the template, the number of documents generated from the template that were opened, the open rate of documents generated from the template, the number of documents generated from the template in which links were clicked, the link click rate for documents generated from the template, the number of purchases that resulted from documents generated from a template, purchase rate for documents generated from a template.

According to one embodiment, the template recommendation system selects, as the most effective templates from the candidate templates that match the template selection criteria, the n templates with the greatest numbers of documents read, the n templates with the greatest read rates, the n templates with the greatest numbers of documents opened, the n templates the greatest document open rates, the n templates with the greatest numbers of click events, the n templates with the greatest link click rates, the n templates with the greatest numbers of purchases, the n templates with the greatest purchase rates. For example, if n is 10 and the performance metric is documents opened, the template recommendation system ranks the candidate templates based on the number of read events associated with each template and selects the top ten candidate templates as the most effective templates.

At step 906, the template layout recommendation system generates exemplar documents from the n effective templates. For example, in one embodiment, document analyzer 126 of FIG. 1, invokes the services of server 112 to convert each of the n templates to a respective PDF document.

At step 910, the template layout recommendation analyzes the generated documents to determine a similarity for the documents or elements within the documents. Similarity can be determined in several ways. According to one embodiment, if the variation in size, position, color or other layout parameter of the documents or elements rendered in the documents generated from the n templates is within a threshold variation, the documents or elements can be considered similar for the n templates.

If the values of one or more layout parameters are sufficiently similar (e.g., based on rules) the layout information for those parameters can be selected from one of the n templates as the suggested layout information for that parameter (step 912). For example, if for an editing event to create a new template of a template type, it is determined that the background color for the n effective templates selected for the editing event are sufficiently similar, then the background color can be suggested as the background color for the overall template layout. As another example, if for an editing event to add a template element of a template element type to a template being designed, the template layout recommendation system determines that the sizes and positions of template elements of that element type rendered in the n documents are sufficiently similar, then the size and position information from one of the n templates can be provided as suggested layout information for the template element being added by the designer.

If the values of one or more layout parameters are sufficiently similar (e.g., based on rules) the template layout recommendation system can return an indication that there is no suggested layout information for the template/template element subject to the editing event (step 914).

FIG. 9 is merely illustrative and the disclosed subject matter is not limited to the ordering or number of steps illustrated. Embodiments may implement additional steps or alternative steps, omit steps, or repeat steps. Various steps may be repeated. For example, steps 902-914 may be repeated for multiple editing events.

Figure 10:
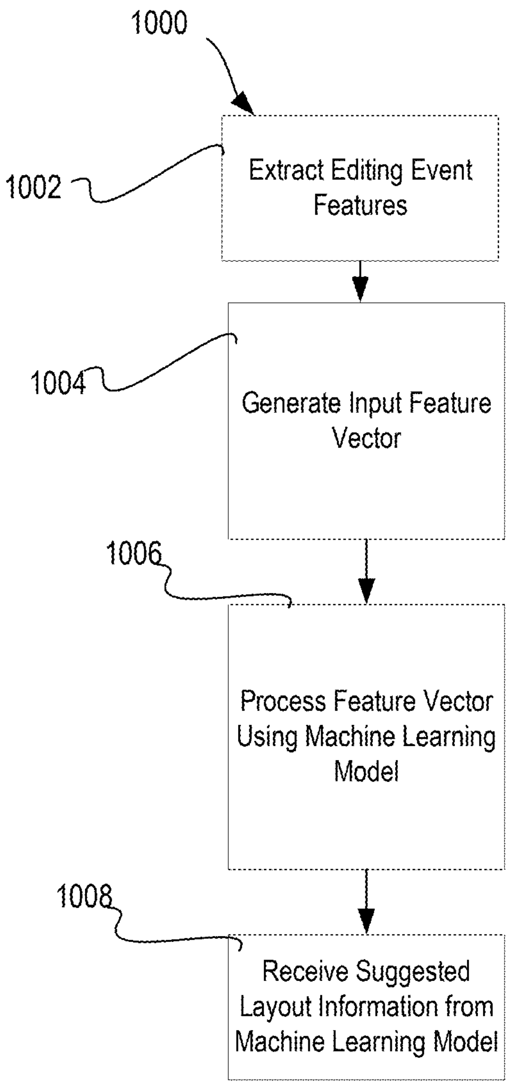
FIG. 10 is a flowchart illustrating another embodiment of a method for determining a recommended layout.

FIG. 10 is a flowchart illustrating one embodiment of a method 1000 for recommending template layout information. Method 1000 may be implemented as one embodiment of step 708. Embodiments of FIG. 10 may be embodied, according to one embodiment, as computer executable instructions stored on a non-transitory computer readable medium. Even more particularly, one embodiment of the steps of FIG. 10 may be implemented by analytics engine 116.

At step 1002, the template layout recommendation system extracts editing event features from the editing event data. The editing event features, according to one embodiment, represent one or more of: template metadata or template element metadata from the editing event data. In a more particular embodiment, the editing event features represent one or more of: the template (e.g., by template name, template id, or another identifier of the template), a template type, channel, target audience, a template element (e.g., by template element name, template element id, or another identifier of template element), or template element type. The template layout recommendation system generates a feature vector from the extracted features (step 1004) and inputs the feature vector into a machine learning model (step 1006). In some embodiments, the feature vector includes an indication of one or more performance metrics for which to optimize the layout. Furthermore, in some embodiments, the feature vector for the editing event with respect to a template element includes template element features for other template elements already selected for the template being edited.

The machine learning model is trained to output a suggested layout for the input editing event features. More particularly, the machine learning model is trained to output the suggested layout information for the editing event that is predicted to be the most effective layout information for one or more performance metrics. According to one embodiment, the machine learning model is trained using overall template features, contained template element features, and performance metric features. Nonlimiting examples of overall template features, contained template element features, and performance metric features are discussed in conjunction with machine learning model 128 above. At step 1008, the machine learning model returns suggested layout information for the editing event.

FIG. 10 is merely illustrative and the disclosed subject matter is not limited to the ordering or number of steps illustrated. Embodiments may implement additional steps or alternative steps, omit steps, or repeat steps. Various steps may be repeated. For example, steps 1002-1008 may be repeated for multiple editing events.

Those skilled in the relevant art will appreciate that embodiments of the present invention can be implemented or practiced with a variety of computer system configurations including, without limitation, multi-processor systems, network devices, mini-computers, mainframe computers, data processors, and the like. The invention can be embodied in a general-purpose computer, or a special purpose computer or data processor that is specifically programmed, configured, or constructed to perform the functions described in detail herein. The invention can also be employed in distributed computing environments, where tasks or modules are performed by remote processing devices, which are linked through a communications network such as a LAN, WAN, and/or the Internet.

In a distributed computing environment, program modules or subroutines may be located in both local and remote memory storage devices. These program modules or subroutines may, for example, be stored or distributed on computer-readable media, including magnetic and optically readable and removable computer discs, stored as firmware in chips, as well as distributed electronically over the Internet or over other networks (including wireless networks). Example chips may include Electrically Erasable Programmable Read-Only Memory (EEPROM) chips. Embodiments discussed herein can be implemented in suitable instructions that may reside on a non-transitory computer readable medium, hardware circuitry or the like, or any combination and that may be translatable by one or more server machines. Examples of a non-transitory computer readable medium are provided below in this disclosure.

Although the invention has been described with respect to specific embodiments thereof, these embodiments are merely illustrative, and not restrictive of the invention. Rather, the description, including the Summary and Abstract, is intended to describe illustrative embodiments, features and functions to provide a person of ordinary skill in the art context to understand the invention without limiting the invention to any particularly described embodiment, feature or function, including any such embodiment feature or function described. While specific embodiments of, and examples for, the invention are described herein for illustrative purposes only, various equivalent modifications are possible within the spirit and scope of the invention, as those skilled in the relevant art will recognize and appreciate.

As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of: the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Embodiments discussed herein can be implemented in a set of distributed computers communicatively coupled to a network (for example, the Internet). Any suitable programming language can be used to implement the routines, methods or programs of embodiments of the invention described herein, including C, C++, Java, JavaScript, HTML, or any other programming or scripting code, etc. Other software/hardware/network architectures may be used. Communications between computers implementing embodiments can be accomplished using any electronic, optical, radio frequency signals, or other suitable methods and tools of communication in compliance with known network protocols.

Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

A "computer-readable medium" may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory. Such a computer-readable medium shall generally be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only to those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the meaning of "in" includes "in" and "on" unless the context clearly dictates otherwise.

What is claimed is:

1. A system for composing templates used for automatically generating communications, the system comprising:

a computer memory storing, in association with a plurality of templates of a template type, a first layout information dataset comprising:

layout information for a plurality of template elements contained in the plurality of templates of the template type; and a first document event dataset comprising user action events captured on documents electronically generated from the plurality of templates of the template type;

a processor coupled to the computer memory;

a non-transitory, computer-readable medium storing thereon a set of computer-executable instructions that are executable by the processor, the set of computer-executable instructions comprising instructions for:

providing a graphical user interface for authoring a new template of the template type;

receiving, based on a user interaction with the graphical user interface, a request to add a first template element of a first template element type to the new template of the template type;

determining a recommended layout for the first template element based on:

an effectiveness of the plurality of templates, wherein the effectiveness of the plurality of templates is determined using efficiency parameters and layout parameters;

wherein determining the efficiency parameters comprising analyzing a second document event dataset comprising, from the first document event dataset, data for document events captured on electronic documents generated from a first template of the plurality of templates of the template type; and wherein determining the layout parameters comprising analyzing a second layout information dataset comprising layout information for the first template from the first layout information dataset;

presenting the recommended layout for the first template element in the graphical user interface as a first recommendation;

adding the first template element to the new template formatted according to the recommended layout for the first template element; and storing the new template in a database of templates used to electronically generate documents.

2. The system of claim 1, wherein determining the recommended layout for the first template element comprises:

determining candidate templates from the plurality of templates based on a template selection criterion, wherein the first template is a candidate template and wherein the second document event dataset includes data for events captured on electronic documents generated from each of the candidate templates;

selecting the first template as layout source template from the candidate templates based on ranking the candidate templates using the second document event dataset; and selecting a layout of a respective template element of the first template element type in the first template as the recommended layout for the first template element in the new template.

3. The system of claim 1, wherein determining the recommended layout for the first template element comprises:

determining candidate templates from the plurality of templates based on a template selection criterion, wherein the first template is a candidate template and wherein the second document event dataset includes data for events captured on electronic documents generated from each of the candidate templates;

determining effective templates from the candidate templates based on the second document event dataset;

generating exemplar documents from the effective templates;

determining a similarity between the exemplar documents;

based on a determination of the similarity between the exemplar documents, selecting as the recommended layout for the first template element, a layout of a template element of the first template element type contained in one of the effective templates.

4. The system of claim 1, wherein the set of computer-executable instructions comprises instructions for:

receiving a request to add a second template element of a second template element type to the new template; and responsive to the request to add the second template element to the new template, determine a revised recommended layout for the first template element and a recommended layout for the second template element based on a third document event dataset and a third layout information dataset, the third document event dataset comprising data, from the first document event dataset, for events captured on electronic documents generated from a first set of templates from the plurality of templates, and the third layout information dataset comprising layout information, from the first layout information dataset, for template elements of the first template element type and template elements of the second template element type, each template in the first set of templates containing a respective template element of the first template element type and a respective template element of the second template element type.

5. The system of claim 1, wherein the computer memory stores a machine learning model that represents the first layout information dataset, the first document event dataset, the second layout information dataset, the second document event dataset, wherein the request to add the first template element comprises editing event data, and wherein determining the recommended layout for the first template element comprises:

extracting editing event features from the editing event data, the editing event features comprising a template metadata feature and a template element metadata feature;

generating a feature vector using the editing event features; and processing the feature vector with the machine learning model to output the recommended layout.

6. The system of claim 5, wherein the layout information represented by the machine learning model includes a parameter indicating whether a user accepted a prior layout recommendation for the first template element.

7. The system of claim 1, wherein the recommended layout comprises at least one of a recommended element location, a recommended element size, a recommended font, a recommended background, or a recommended color.

8. A computer program product comprising a non-transitory, computer-readable medium storing thereon a set of computer-executable instructions that are executable by a processor, the set of computer-executable instructions comprising instructions for:

storing, in a computer memory, in association with a plurality of templates of a template type, a first layout information dataset for a plurality of template elements contained in the plurality of templates of the template type and a first document event dataset for events captured on documents electronically generated from the plurality of templates of the template type;

providing a graphical user interface for authoring a new template of the template type;

receiving, based on a user interaction with the graphical user interface, a request to add a first template element of a first template element type to the new template of the template type;

determining a recommended layout for the first template element based on:

an effectiveness of the plurality of templates, wherein the effectiveness of the plurality of templates is determined using efficiency parameters and layout parameters;

wherein determining the efficiency parameters comprising analyzing a second document event dataset comprising, from the first document event dataset, data for document events captured on electronic documents generated from a first template of the plurality of templates of the template type; and wherein determining the layout parameters comprising analyzing a second layout information dataset comprising layout information for the first template from the first layout information dataset;

presenting the recommended layout for the first template element in the graphical user interface as a first recommendation;

adding the first template element to the new template formatted according to the recommended layout for the first template element; and storing the new template in a database of templates used to electronically generate documents.

9. The computer program product of claim 8, wherein determining the recommended layout for the first template element comprises:

determining candidate templates from the plurality of templates based on a template selection criterion, wherein the first template is a candidate template and wherein the second document event dataset includes data for events captured on electronic documents generated from each of the candidate templates;

selecting the first template as layout source template from the candidate templates based on ranking the candidate templates using the second document event dataset; and selecting a layout of a respective template element of the first template element type in the first template as the recommended layout for the first template element in the new template.

10. The computer program product of claim 8, wherein determining the recommended layout for the first template element comprises:

determining candidate templates from the plurality of templates based on a template selection criterion, wherein the first template is a candidate template and wherein the second document event dataset includes data for events captured on electronic documents generated from each of the candidate templates;

determining effective templates from the candidate templates based on the second document event dataset;

generating exemplar documents from the effective templates;

determining a similarity between the exemplar documents;

based on a determination of the similarity between the exemplar documents, selecting as the recommended layout for the first template element, a layout of a template element of the first template element type contained in one of the effective templates.

11. The computer program product of claim 8, wherein the set of computer-executable instructions comprises instructions for:

receiving a request to add a second template element of a second template element type to the new template; and responsive to the request to add the second template element to the new template, determine a revised recommended layout for the first template element and a recommended layout for the second template element based on a third document event dataset and a third layout information dataset, the third document event dataset comprising data, from the first document event dataset, for events captured on electronic documents generated from a first set of templates from the plurality of templates, and the third layout information dataset comprising layout information, from the first layout information dataset, for template elements of the first template element type and template elements of the second template element type, each template in the first set of templates containing a respective template element of the first template element type and a respective template element of the second template element type.

12. The computer program product of claim 8, wherein storing the first layout information dataset and the first document event dataset comprises storing a machine learning model that represents the first layout information dataset and the first document event dataset, wherein the request to add the first template element to the new template comprises editing event data, and wherein determining the recommended layout for the first template element further comprises:

extracting editing event features from the editing event data, the editing event features comprising a template metadata feature and a template element metadata feature;

generating a feature vector using the editing event features; and processing the feature vector with the machine learning model to output the recommended layout.

13. The computer program product of claim 12, wherein the first layout information dataset represented by the machine learning model includes a parameter indicating whether a user accepted a prior layout recommendation for the first template element.

14. The computer program product of claim 8, wherein the recommended layout comprises at least one of a recommended element position, a recommended element size, a recommended font, a recommended background, or a recommended color.

15. A computer-implemented method for composing templates used for automated generation of communications:

storing, in a computer memory, in association with a plurality of templates of a template type, a first layout information dataset for a plurality of template elements contained in the plurality of templates of the template type and a first document event dataset for events captured on documents electronically generated from the plurality of templates of the template type;

providing a graphical user interface for authoring a new template of the template type;

receiving, based on a user interaction with the graphical user interface, a request to add a first template element of a first template element type to the new template of the template type;

determining a recommended layout for the first template element based on:

an effectiveness of the plurality of templates, wherein the effectiveness of the plurality of templates is determined using efficiency parameters and layout parameters;

wherein determining the efficiency parameters comprising analyzing a second document event dataset comprising, from the first document event dataset, data for document events captured on electronic documents generated from a first template of the plurality of templates of the template type; and wherein determining the layout parameters comprising analyzing a second layout information dataset comprising layout information for the first template from the first layout information dataset;

presenting the recommended layout for the first template element in the graphical user interface as a first recommendation;

adding the first template element to the new template formatted according to the recommended layout for the first template element; and storing the new template in a database of templates used to electronically generate documents.

16. The method of claim 15, wherein determining the recommended layout for the first template element comprises:

determining candidate templates from the plurality of templates based on a template selection criterion, wherein the first template is a candidate template and wherein the second document event dataset includes data for events captured on electronic documents generated from each of the candidate templates;

selecting the first template as layout source template from the candidate templates based on ranking the candidate templates using the second document event dataset; and selecting a layout of a respective template element of the first template element type in the first template as the recommended layout for the first template element in the new template.

17. The method of claim 15, wherein determining the recommended layout for the first template element comprises:

determining candidate templates from the plurality of templates based on a template selection criterion, wherein the first template is a candidate template and wherein the second document event dataset includes data for events captured on electronic documents generated from each of the candidate templates;

determining effective templates from the candidate templates based on the second document event dataset;

generating exemplar documents from the effective templates;

determining a similarity between the exemplar documents;

based on a determination of the similarity between the exemplar documents, selecting as the recommended layout for the first template element, a layout of a template element of the first template element type contained in one of the effective templates.

18. The method of claim 15, further comprising:

receiving, via the graphical user interface, a request to add a second template element of a second template element type to the new template; and responsive to the request to add the second template element to the new template, determine a revised recommended layout for the first template element and a recommended layout for the second template element based on a third document event dataset and a third layout information dataset, the third document event dataset comprising data, from the first document event dataset, for events captured on electronic documents generated from a first set of templates from the plurality of templates, and the third layout information dataset comprising layout information, from the first layout information dataset, for template elements of the first template element type and template elements of the second template element type, each template in the first set of templates containing a respective template element of the first template element type and a respective template element of the second template element type.

19. The method of claim 15, wherein storing the first layout information dataset and the first document event dataset comprises storing a machine learning model that represents the first layout information dataset and the first document event dataset, wherein the request to add the first template element to the new template comprises editing event data, and wherein determining the recommended layout for the first template element further comprises:

extracting editing event features from the editing event data, the editing event features comprising a template metadata feature and a template element metadata feature;

generating a feature vector using the editing event features; and processing the feature vector with the machine learning model to output the recommended layout.

20. The method of claim 19, wherein the first layout information dataset represented by the machine learning model includes a parameter indicating whether a user accepted a prior layout recommendation for the first template element.

21. The method of claim 15, wherein the recommended layout comprises at least one of a recommended element position, a recommended element size, a recommended font, a recommended background, or a recommended color.

* * * * *